US012696031B2

(12) United States Patent
Bretthauer

(10) Patent No.: US 12,696,031 B2
(45) Date of Patent: Jul. 28, 2026

(54) MICRO-SPEAKER DEVICE

(71) Applicant: Infineon Technologies AG, Neubiberg (DE)

(72) Inventor: Christian Bretthauer, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 149 days.

(21) Appl. No.: 18/609,732

(22) Filed: Mar. 19, 2024

(65) Prior Publication Data

US 2024/0323591 A1 Sep. 26, 2024

(30) Foreign Application Priority Data

Mar. 23, 2023 (EP) .................................... 23163803

(51) Int. Cl.

| | |
|---|---|
| ***H03G 5/00*** | (2006.01) |
| ***H04R 1/02*** | (2006.01) |
| ***H04R 1/28*** | (2006.01) |
| ***H04R 3/04*** | (2006.01) |
| ***H04R 17/00*** | (2006.01) |
| *H04R 25/00* | (2006.01) |

(52) U.S. Cl.

CPC ........... *H04R 1/2811* (2013.01); *H04R 1/025* (2013.01); *H04R 3/04* (2013.01); *H04R 17/00* (2013.01); *H04R 2201/003* (2013.01)

(58) Field of Classification Search

CPC ........ H04R 1/2811; H04R 1/025; H04R 3/04; H04R 17/00; H04R 2201/003

USPC .................................................... 381/98, 150

See application file for complete search history.

(56) References Cited

U.S. PATENT DOCUMENTS 11,445,279 B2 9/2022 Liang et al.
2016/0345104 A1* 11/2016 Margalit ................ H04R 1/345
2016/0360321 A1 12/2016 Margalit
2016/0381464 A1* 12/2016 Elyada ................... G10K 15/04 381/97
2022/0183659 A1* 6/2022 Margalit .............. A61B 8/5207
2023/0300540 A1 9/2023 Liang et al.

* cited by examiner

*Primary Examiner* — Ammar T Hamid
(74) *Attorney, Agent, or Firm* — Slater Matsil, LLP

(57) ABSTRACT

A speaker device comprises a housing having an acoustic aperture, a transducer element in the housing configured to receive a first actuation signal and to generate an acoustic output signal. The speaker device comprises a shutter element in the housing configured to receive a second actuation signal and arranged laterally offset to the transducer in the housing. The shutter element is arranged in an acoustic path between the transducer element and the acoustic aperture and comprises a shutter portion movable in opposite directions in response to the second actuation signal. A controller provides the first actuation signal to the transducer element, while the first actuation signal has an ultrasonic signal component modulated with an audio signal component. The controller provides the second actuation signal to the shutter element that has half the frequency of the ultrasonic signal component.

20 Claims, 16 Drawing Sheets

30

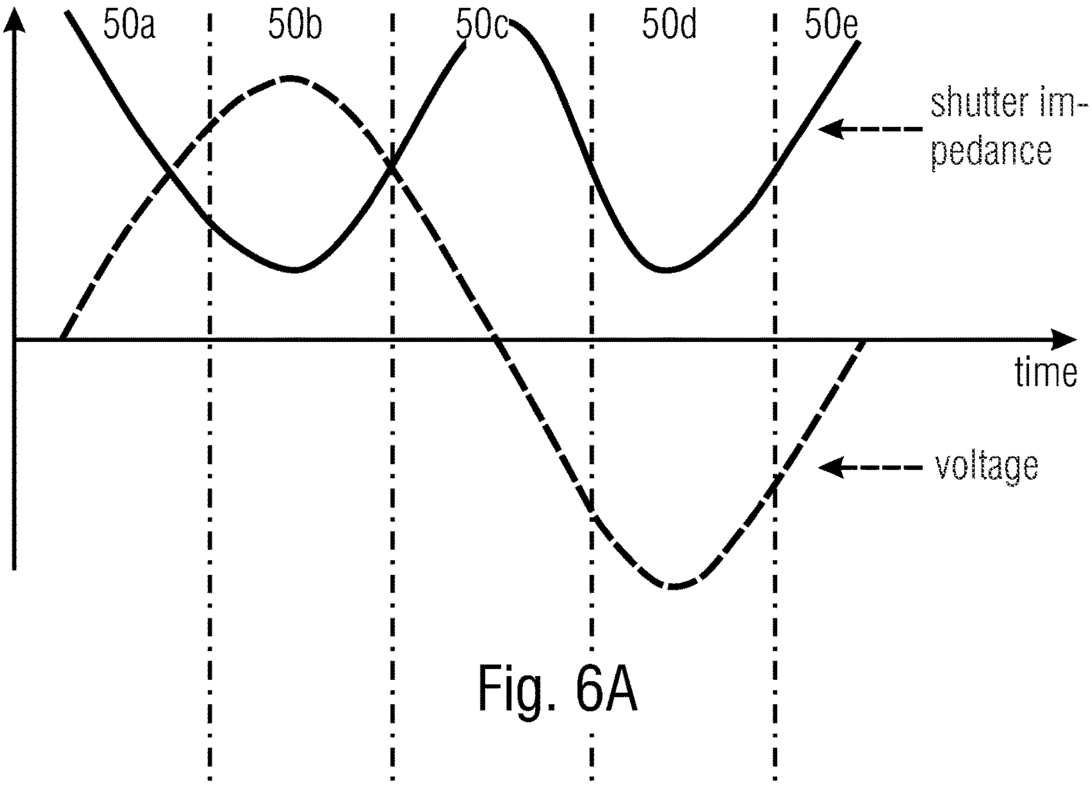
Fig. 6A
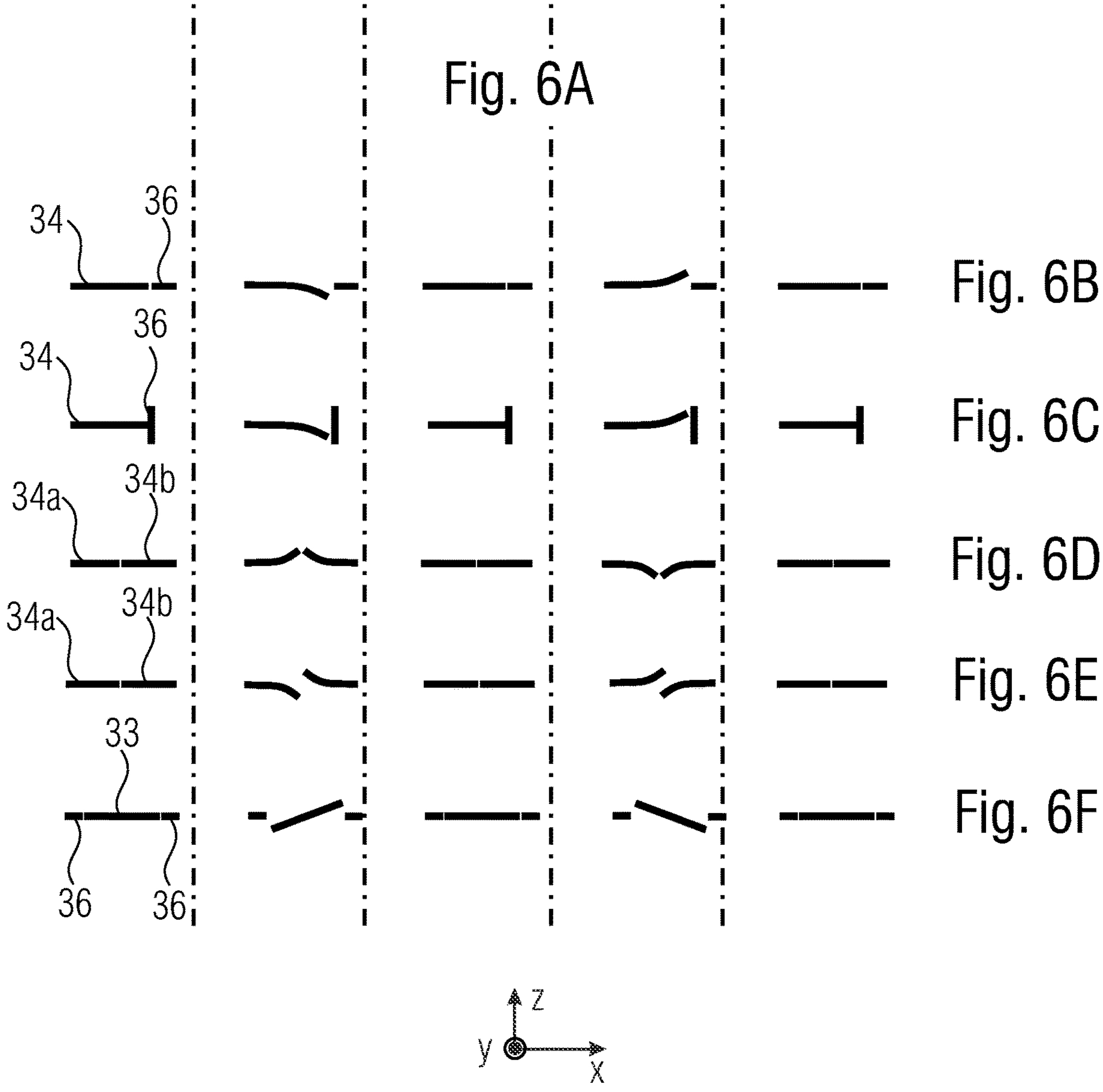
Fig. 6B
Fig. 6C
Fig. 6D
Fig. 6E
Fig. 6F

30

MICRO-SPEAKER DEVICE

This application claims the benefit of European Patent Application No. 23163803, filed on Mar. 23, 2023, which application is hereby incorporated herein by reference.

TECHNICAL FIELD

Embodiments of the present disclosure relate to a speaker device. In particular, embodiments may relate to a micro-speaker or a micro-electric-mechanical system (MEMS) micro-speaker having a piezoelectric ultrasonic modulator. Thus, embodiments may further relate to an ultrasonic demodulator for micro-speaker applications.

BACKGROUND

MEMS micro-speakers (loudspeakers), e.g. in form of piezoelectric MEMS devices, are used for emitting acoustic sound to the environment. As such, miniature MEMS micro-speakers can reduce an overall package size of battery operated speakers, such as used for hearing aids.

A challenge for MEMS micro speakers is to provide a sufficiently high sound pressure level (SPL), especially for acoustic bass frequencies, e.g., low acoustic frequencies in a frequency range between 60 to 250 Hz.

SUMMARY

According to an embodiment, a speaker device comprises a housing having an acoustic aperture, a transducer element in the housing configured to receive a first actuation signal and to generate an acoustic output signal in response to the first actuation signal, a shutter element in the housing configured to receive a second actuation signal, where the shutter element is arranged laterally offset to the transducer in the housing, and where the shutter element is arranged in an acoustic path between the transducer element and the acoustic aperture and comprises a movable shutter portion, which is movable in opposite directions in response to the second actuation signal, and a controller configured to provide the first actuation signal to the transducer element, where the first actuation signal has an ultrasonic signal component which is modulated with an audio signal component, and to provide the second actuation signal to the shutter element, where the second actuation signal has half the frequency of the ultrasonic signal component.

According to an embodiment, the shutter element spans the acoustic path.

According to an embodiment, the shutter element further comprises a stationary portion (e.g., a static element), which surrounds (e.g., frames or borders) the movable shutter portion. At least a portion of the movable shutter portion may be separated by a slit from at least one of the stationary portion and one or more movable shutter portions. At least a part of the stationary portion may be formed in one piece with at least one movable shutter portion.

According to an embodiment, the movable shutter portion of the shutter element is in a closed condition aligned in parallel to or in the same plane with the stationary portion of the shutter element.

According to an embodiment, the movable shutter portion of the shutter element comprises a single movable shutter portion, which is movable in opposite directions in response to the second actuation signal.

According to an embodiment, the movable shutter portion of the shutter element comprises a first and second movable shutter portion, which are movable in opposite directions in response to the second actuation signal, where the first movable shutter portion comprises a first cantilever element or a first group of cantilever elements, and the second movable shutter portion comprises a second cantilever element or a second group of cantilever elements, and where the first and second movable shutter portion are arranged laterally adjacent to each other.

According to an embodiment, the movable shutter portion of the shutter element comprises a disc element which is tiltable around a tilting axis, where a first and second movable shutter portion of the disc element extend in opposite directions from the tilting axis.

Thus, embodiments of the present disclosure use an ultrasonic demodulation concept for providing a speaker device, e.g., a MEMS micro-speaker, which can provide a sufficiently high sound pressure level over the complete acoustic frequency range and, especially, in a low frequency range (e.g., for acoustic bass frequencies).

According to embodiments, the speaker device implements the ultra-sonic demodulation concept by positioning the transducer element and the shutter element in the housing in a laterally offset arrangement to each other, where the shutter element is arranged in the acoustic path between the transducer element and the acoustic aperture in the housing. According to embodiments, the shutter element, which is moveable in (vertical) opposite directions (e.g., in vertically opposite directions with respect to the acoustic aperture) is driven with an actuation signal having half the frequency of the actuation signal of the transducer element.

The arrangement and actuation of the shutter element provides a demodulating functionality of the shutter element with respect to the output signal from the transducer element. Thus, an output signal having the audio frequency (of the audio signal component) can be provided at the acoustic aperture as the acoustic output signal of the speaker device (micro-speaker).

Certain disclosed embodiments of a speaker device, e.g., a piezoelectric MEMS micro speaker, can provide, for example, a number of improved technical characteristics. The speaker device may remain unexposed (or to a very low extent) to a so-called “squeeze film damping”. The term “squeeze film damping” or “squeeze film air damping” represents the effect to the opposite force of air on moveable structures, when the air is squeezed or sucked by means of the moveable structures.

Moreover, the used active area of the speaker device can be large when compared to the completely used area of the speaker device. Moreover, the speaker device can provide a low power consumption, such as a reduced power consumption when compared to conventional MEMS micro speaker applications.

BRIEF DESCRIPTION OF THE DRAWINGS

In the following, embodiments of the present disclosure are described in more detail with respect to the figures, in which:

FIG. 6*a* shows a schematic graphical illustration of a period of the second actuation signal and the associated shutter air impedance (fluidic impedance) of the shutter element resulting from the movement of one or more moveable shutter elements, according to an embodiment;

FIG. 6*b* shows a schematic cross section of a shutter element with a single cantilever structure and static element comprising a plate portion of the speaker device according to an embodiment;

FIG. 6*c* shows a schematic cross section of a shutter element with a single cantilever structure and a static element comprising a wall portion of the speaker device according to an embodiment;

FIG. 6*d* shows a schematic cross section of a shutter element with two cantilever structures that are moving in phase of the speaker device according to an embodiment;

FIG. 6*e* shows a schematic cross section of a shutter element with two cantilever structures that are moving in counter phase of the speaker device according to an embodiment;

FIG. 6*f* shows a schematic cross section of a shutter element with a disc element which is tiltable around a tilting axis of the speaker device according to an embodiment;

In the following description, embodiments are discussed in further detail using the figures, where in the figures and the specification identical elements and elements having the same functionality and/or the same technical or physical effect are provided with the same reference numbers or are identified with the same name.

DETAILED DESCRIPTION

In the following description, embodiments are discussed in detail, however, it should be appreciated that the embodiments provide many applicable concepts that can be embodied in a wide variety of semiconductor devices. The specific embodiments discussed are merely illustrative of specific ways to make and use the disclosed subject matter, and do not limit the scope of the embodiments. In the following description of embodiments, the same or similar elements having the same function have associated therewith the same reference signs or the same name, and a description of such elements will not be repeated for every embodiment. Moreover, features of the different embodiments described hereinafter may be combined with each other.

In the description of the embodiments, terms and text passages placed in brackets (next to a described element or function) are to be understood as further explanations, exemplary configurations, exemplary additions and/or exemplary alternatives of the described element or function.

It is understood that when an element is referred to as being "connected" or "coupled" to another element, it may be directly connected or coupled to the other element, or may be connected or coupled to intermediate elements that may be present. Conversely, when an element is referred to as being "directly" connected to another element, "connected" or "coupled," there may be no intermediate elements. Other terms used to describe the relationship between elements should be construed in a similar fashion (e.g., "between" versus "directly between", "adjacent" versus "directly adjacent", and "on" versus "directly on", etc.).

For facilitating the description of the different embodiments, some of the figures comprise a Cartesian coordinate system x, y, z, where the x-y-plane corresponds, i.e. is parallel, to a main surface region (a reference plane or x-y-plane) of a substrate, for example, where the direction vertically up with respect to the reference plane (x-y-plane) corresponds to the "+z" direction, and where the direction vertically down with respect to the reference plane (x-y-plane) corresponds to the "−z" direction. In the following description, the term "lateral" means a direction parallel to the x- and/or y-direction or a direction parallel to (or in) the x-y-plane, where the term "vertical" means a direction parallel to the z-direction.

Figure 1A:
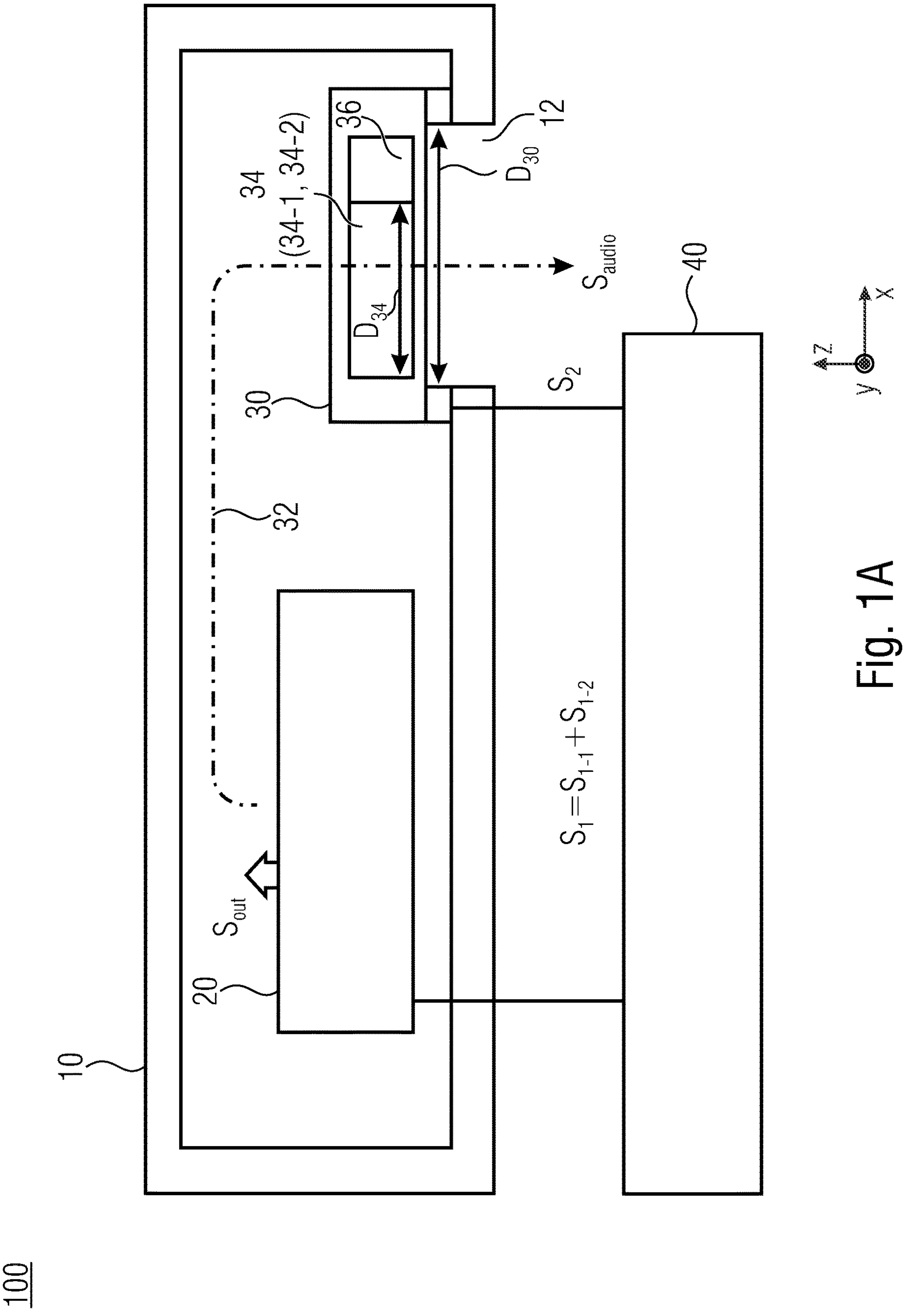
FIG. 1*a* shows an exemplary cross-sectional view of a speaker device according to an embodiment.

FIG. 1*a* shows an exemplary cross-sectional view of a speaker device 100 according to an embodiment. As shown in FIG. 1*a*, the speaker device 100 comprises a housing 10 having an acoustic aperture 12, and a transducer element 20 in the housing 10 configured to receive a first actuation signal S1 and to generate an acoustic output signal SOUT (e.g., in the ultra-sonic range) in response to the first actuation signal S1. The speaker device 100 further comprises a shutter element 30 in the housing 10, where the shutter element 30 is configured to receive a second actuation signal S2. The shutter element 30 is arranged laterally offset to the transducer element 20 in the housing 10. The shutter element 30 is arranged in an acoustic path (or sound path) 32 between the transducer element 20 and the acoustic aperture (e.g., a sound port) 12 and comprises a moveable shutter portion 34 (34-1, 34-2), which is moveable (deflectable) in opposite directions (e.g., in vertically opposite directions) in response to the second actuation signal S2.

The speaker device 100 further comprises a controller 40 (e.g., application specific integrated circuit (ASIC)) which is configured to provide the first actuation signal S1 to the transducer element 20, where the first actuation signal S1 has an ultra-sonic signal component S1-1 (as a carrier signal) which is modulated with an audio signal component S1-2. The controller 40 is further configured to provide the second actuation signal S2 to the shutter element 30, where the second actuation signal S2 has half the frequency (divided by 2) of the ultra-sonic signal component S1-1.

The arrangement and actuation of the shutter element 30 provides a demodulating functionality of the shutter element 30 with respect to the output signal Sout from the transducer element 20. Based on the demodulating functionality of the shutter element 30 (with respect to the output signal Sout from the transducer element 20), the micro speaker 100 provides an output signal having the audio frequency (of the audio signal component S1-2) as the acoustic output signal Saudio of the speaker device (micro-speaker) 100 at the acoustic aperture 12.

The transducer element 20 and the shutter element 30 may be arranged in the same plane in the housing 10. The transducer element 20 and the shutter element 30 may be arranged in a neighboring position and, e.g., in the same layer (in the same lateral plane) or may be arranged in a neighboring position and in different vertically offset planes (with a different vertical offset to the reference plane).

Thus, due to their lateral offset arrangement, the transducer element 20 and shutter element 30 may be formed without a separation element, for example, such as a spacer layer, a blind element, or a dedicated acoustic pipe.

Moreover, the shutter element 30 may comprise a stationary portion 36, which surrounds or frames the moveable shutter portion(s) 34 (34-1, 34-2). The shutter element 30 comprises the moveable shutter portion(s) 34 (34-1, 34-2) and the (laterally adjacent) stationary portion 36. Thus, the movable shutter portion(s) 34 (34-1, 34-2) may have a smaller lateral extension or diameter D34 or a smaller footprint than the surrounding stationary portion 36. For example, FIG. 1*a* shows a lateral extension D34 of the movable shutter element 34. The lateral extension D34 of the movable shutter element 34 may be smaller than a (lateral) cross-sectional area D30 of an exposed or freestanding part of the shutter element 30, which spans the acoustic path 32. Thus, the cross-sectional area D30 also corresponds to the (lateral) extension of the acoustic path 32 at the shutter element 30. Thus, the movable shutter portion(s) 34 (34-1, 34-2) may have a smaller lateral extension or diameter D34 or a smaller footprint than (the exposed or freestanding part of) the shutter element 30, which spans the acoustic path 32. Thus, the shutter element 30 may comprise a modulating (demodulating) functionality with respect to the acoustic output signal as output from the transducer element 20. The smaller lateral extension D34 of the movable shutter portion 34 (compared to the cross-sectional area D30) may prevent contaminations (e.g., dust particles) to enter the housing 10 and/or may prevent that the free movement (deflection) of the shutter element 30 is hindered or (e.g., completely) restricted by a contamination, e.g. a (dust) particle in the wrong place. Based on the configuration of the speaker device 100, the speaker device 100 may be more particle robust.

The deflection of the moveable shutter portion 34 or the plurality of moveable shutter portions 34-1, 34-2 in vertically opposite directions in response to the second actuation signal S2 can result in a frequency doubling behavior of the acoustic impedance of the shutter element 30, which reduces the frequency of the supplied electrical second actuation signal S2 by a factor of 2 compared to the ultrasonic signal component S1-1 and, thus, also reduces the reactive power for actuating the shutter element 30.

According to the laterally offset arrangement of the transducer element 20 and the shutter element 30 in the housing 10, a higher quality factor Q can be achieved due to a low squeeze film damping, which results in a reduced needed level (voltage level) of the actuation signal. Thus, improved power (e.g., reduced power consumption) and ASIC specifications can be achieved. A low squeeze film damping may, for example, be realized by the movable shutter portion(s) 34 having smaller dimensions than the surrounding stationary portion 36 (e.g., separated by a thin slit). Such an arrangement may reduce the amount of parallel surfaces moving relative to each other and may therefore reduce a squeeze film damping between such parallel surfaces.

The speaker device 100 may be used to for ultrasound demodulation that allows generating bass frequencies with a high sound pressure level. The speaker device 100 can therefore be built more compactly and/or provide more space for a battery power source compared to typical electrodynamic or balanced armature speaker devices. Furthermore, a more compact speaker device 100 may improve comfort for the user.

The ultrasonic signal component S1-1 may be in a frequency range of 75 kHz and 400 kHz, for example in a range of 200 kHz to 300 kHz, for example at least 100 kHz or above. The audio signal component S1-2 may be limited to frequencies below 20 kHz, such as below 15 kHz, e.g., below 10 kHz or between 20 Hz and 20 kHz.

The shutter element 30 may span or cover the acoustic path 32. For example, the shutter element 30 may span a (lateral) cross-sectional area D30 of the acoustic path 32. The cross-sectional area D30 of the acoustic path 32 may be an area of a substrate structure or membrane structure that is not clamped and/or that is contact with a fluid (e.g., air) on one or both of its sides, such as the exposed or freestanding part of the shutter element 30, which spans the acoustic path 32.

The shutter element 30 may be configured to provide consecutive open and closed conditions of the acoustic path 32 based on the second actuation signal S2, where the shutter element 30 is configured to comprise two closed conditions during one period (2π radians) of the second actuation signal S2. In other words, the shutter element 30 may comprise a movable shutter portion 34 configured to provide the closed condition (e.g., resulting in a large shutter impedance) when arranged in a closing position (e.g., aligned with the stationary portion 36) and to provide open conditions (e.g., a reduced shutter impedance compared to the closed configuration) when being moved (e.g., out of the closing position) in either of the opposite directions. The shutter element 30 may function as a rectifier-like component that decreases shutter impedance (or increases sound transmission) dependent on an amplitude of the second actuator signal S2. As a result, the shutter element 30 may be operated at a lower frequency, which may reduce energy consumption and exposure of a user to ultrasound.

The movable shutter portion 34 of the shutter element 30 may be aligned in parallel to the acoustic aperture 12, when the movable shutter portion 34 is in a closed condition. For example the movable shutter portion 34 has a plate shape that is configured to be bent or rotated based on the second actuation signal S2, where the plate shape is configured to be arranged parallel to the acoustic aperture 12 by being bent into a flat shape or by being rotated into the parallel orientation (e.g., due to an applied force or a lack thereof).

The open and closed conditions may be defined by the ability of the shutter element 30 to reduce a sound intensity of sound passing through the shutter element 30 (e.g., via the acoustic path 32). Alternatively, the open and closed conditions may be defined by the ability of the shutter element 30 to control air resistance through the shutter element 30. The property of the shutter element 30 to reduce and increase sound intensity and/or increase and decrease air resistance is herein defined as "shutter impedance" (or acoustic impedance measured in units of kg·m-2·s-1). The closed condition may be defined by a configuration of the shutter element 30, in which a sound intensity of sound that is passing through the shutter element 30 is decreased by more than 75%, 90%, or 99%. The closed condition may be defined by an acoustic impedance (or shutter impedance) that is larger than 50%, 10%, or 1% of an acoustic impedance of the open condition.

The shutter portion 34 (34-1, 34-2) may be configured to oscillate between two maximum deflection positions, where at least at the maximum deflection positions, the shutter element 30 provides the open condition. The shutter portion 34 may have a closing position or a range of closing positions between the two maximum deflection positions, in which the shutter element 30 is configured to provide the closed condition.

The shutter portion 34 may have a non-deflected (e.g., non-biased) position. The non-deflected position may be the closing position or be within the closing range. Alternatively, the non-deflection position of the shutter portion 34 may be outside the closing range (e.g., one of the two maximum deflection positions).

The shutter element 30 may optionally comprise a stationary portion 36 (e.g., a static element) which surrounds or frames the movable shutter portion 34. For example the stationary portion 36 may be arranged so as to at least partially border the single movable shutter portion 34.

The stationary portion 36 may have a wall portion that extends parallel to the opposite directions that the shutter element 30 is movable in. Alternatively or additionally, the stationary portion 36 may have a plate portion that extends perpendicular to the opposite directions that the shutter element 30 is movable in. The movable shutter portion 34 of the shutter element 30 may be in a closed condition aligned in parallel to or in the same plane with the stationary portion 36 of the shutter element 30.

According to a further embodiment, the shutter element 30 may comprise a first and second movable shutter portion 34-1, 34-2, which are movable in (vertically) opposite directions in response to the second actuation signal S2, where the first movable shutter portion 34-1 may be formed by a first (piezo-electrically actuated) cantilever element (or a first group of cantilever elements), and the second movable shutter portion 34-2 may formed by a second (piezo-electrically actuated) cantilever element (or second group of cantilever elements), and where the first and second movable shutter portions 34-1, 34-2 are arranged laterally adjacent to each other.

According to a further embodiment, the shutter element 30 may comprise a disc element forming the first and second moveable shutter portion 34-1, 34-2, where the disc element is tiltable around a tilting axis (rotary or center axis), where the first and second movable shutter portions 34-1, 34-2 of the disc element extend in opposite directions from the tilting axis.

The shutter element 30 may provide the closed condition, when the shutter portion 34 is close to and/or aligned with the stationary portion 36. For example, in case of the static portion 36 having a wall portion, the shutter element 30 may be in the closed condition, when the shutter portion has a plate shape that is oriented perpendicular to the wall portion, and an open condition, when the plate shape of the shutter portion is deflected (e.g., bent or rotated) out of the perpendicular orientation. In the case of a static portion 36 having a plate portion, the shutter element 30 may be in the close condition, when the plate portion and the shutter element 30 are arranged in a common plane, and an open condition when the shutter portion 34 is deflected (e.g., bent or rotated) out of the common plane.

The transducer element 20 may comprises a piezo-electrically actuated membrane (diaphragm) structure or a cantilever structure. Piezoelectric elements allow actuation in ultrasound frequency and can be fabricated at compact sizes. The membrane structure or cantilever structure may comprise one or more corrugations.

A diaphragm structure may be formed as a thin flexible disk that vibrates to generate soundwaves, where the diaphragm may be constructed of a thin membrane or sheet of various materials, which suspended at its edges or anchored at its periphery. A cantilever is a projecting beam or member supported at one end. A cantilever is usually a rigid structured element that extends laterally and is supported at one end. The membrane structure or cantilever may comprise a metallic, plastic, insulating or semiconductor material, e.g. poly-Si, for example, where a piezoelectric transducing element is fixed (e.g. mechanically coupled or attached) to the diaphragm or cantilever. According to a further embodiment, the piezoelectric transducing element itself may form the membrane structure or cantilever, where the membrane structure or cantilever may comprise the piezoelectric material of the piezoelectric transducing element.

The transducer element 20 and the shutter element 30 may be arranged in the same (lateral) plane in the housing 10. Deflectable structures of the transducer element 20 and the shutter element 30 may be arranged in the same (lateral plane). The deflectable structures of the transducer element 20 and the shutter element 30 may be structurally connected. For example, the speaker device 100 may comprise a membrane structure that is (at least partially) sectioned by a stator into (at least) two separately deflectable membrane structure portions, where the transducer element 20 comprises one (or more) of the membrane structure portions and the shutter element 30 comprises the other one (or more) of the membrane structure portions. The speaker device 100 may therefore be relatively compact and fabrication of the transducer element 20 and the shutter element 30 may be combined.

A center distance between the transducer element 20 and the shutter element 30 may be less than a quarter (¼) of a wavelength λ1-1 of the of the ultrasonic signal component S1-1. As a result, demodulation of the acoustic output signal SOUT may be improved and phase matching may be facilitated.

The frequency of the ultrasonic signal component S1-1 of the first actuation signal S1 may correspond within a range (or tolerance range) of +/−10% to a resonance frequency of the transducer element 20. The frequency of the second actuation signal S2 may correspond within a range of +/−10% to a resonance frequency of the shutter element 30. This may result in an improved energy efficiency of the speaker device 100 and a further increase of a quality of sound generated by the speaker device 100.

Figure 1C:
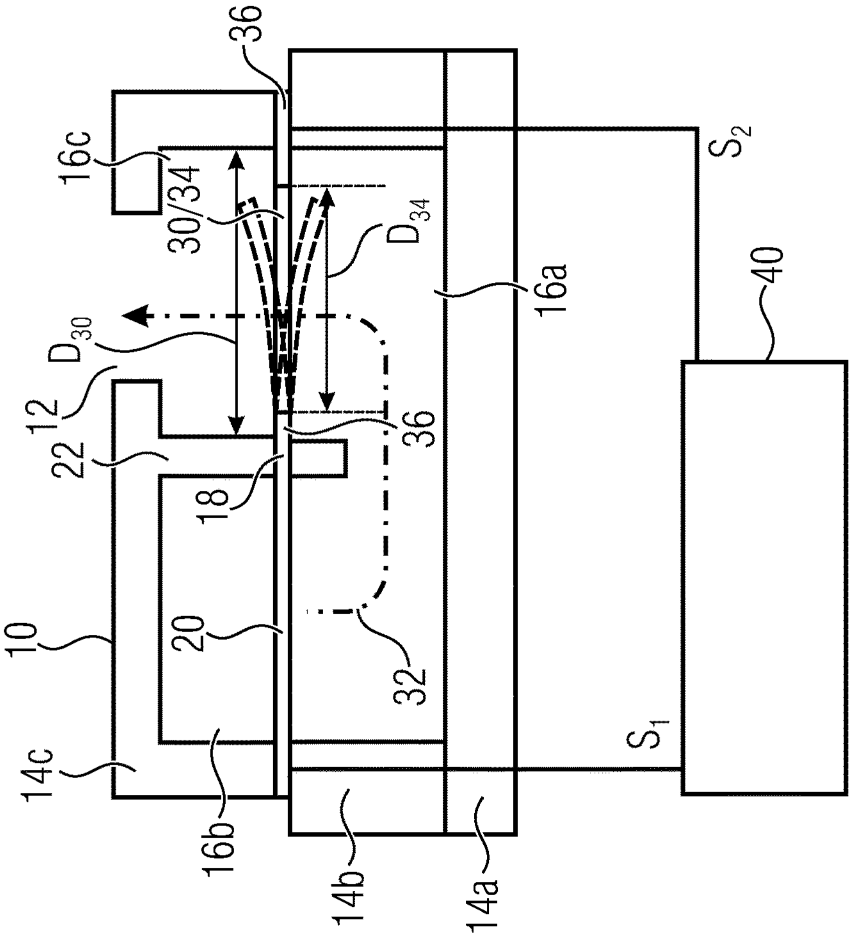
FIG. 1*c* shows an exemplary schematic cross-sectional view of a speaker device, e.g., a MEMS micro speaker, according to an embodiment.
Figure 1B:
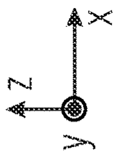
FIG. 1*b* shows an exemplary schematic cross-sectional view of a speaker device, e.g., a MEMS micro speaker, according to an embodiment.
Figure 1B:
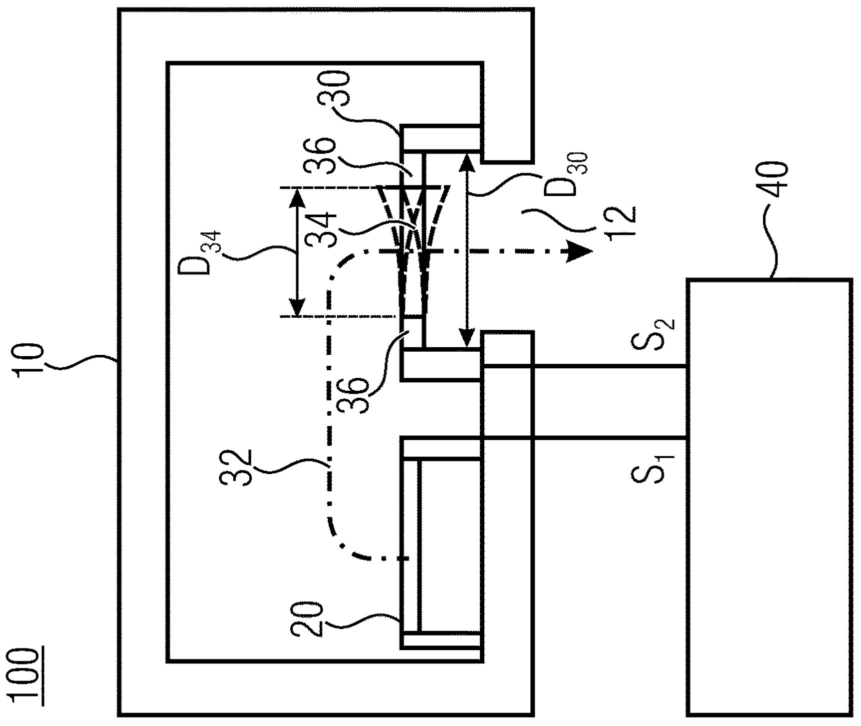

FIG. 1*b* shows an exemplary schematic cross-sectional view of a speaker device 100, e.g., a MEMS micro speaker, according to a further embodiment. In the example shown in FIG. 1*b*, the transducer element 20 comprises a (e.g., circular, rectangular or square, con-vex (or regular convex) polygon shaped) membrane structure. However, the transducer element 20 may comprise any other form of structure such as a cantilever structure.

According to an embodiment of FIG. 1*b*, the shutter element 30 may comprise a single movable shutter portion 34, which is movable in opposite directions in response to the second actuation signal S2. As will be described further below, the shutter element 30 may also comprise a plurality of movable shutter portions 34. A single movable shutter portion 34 may allow a more compact design and reduced device and operation complexity.

The single movable shutter portion 34 comprises or is formed by a (single) cantilever element or by a plurality (two or more) of (equally deflected) cantilever elements. The movable shutter portion 34, as shown, can have a smaller lateral extension (diameter) than the acoustic aperture 12. A smaller lateral extension (diameter) of the shutter portion than the acoustic aperture of the shutter element 30 may provide a modulating or demodulating functionality with respect to the acoustic output signal as output from the transducer element 20. Further, a smaller lateral extension (diameter) of the shutter portion than the acoustic aperture of the shutter element 30 may provide a reduced risk of sticking due to dust contamination. Alternatively, the movable shutter portion 34 may have a larger lateral extension (diameter) than the acoustic aperture 12.

The single movable shutter portion 34 may be formed by a (single) cantilever element or by a group of (equally deflected) cantilever elements, where the movable shutter portion 34 has a smaller (or larger) lateral extension (diameter) than the acoustic aperture.

The cantilever element(s), which form the single movable shutter portion 34, may be bordered by a stationary portion 36 such as a frame surrounding at least a part of a deflectable portion of the cantilever element 34. In the closed condition, the cantilever element(s) is (are) aligned with the bordering stationary portion 36. As a result, sound (or the transmission of sound) across the shutter element 30 can be (fully or partly) attenuated. When the shutter element is driven with the second actuation signal S2, the cantilever element(s) moves (move) in opposite directions. To this end, the cantilever element(s) can be bent out of alignment with the stationary portion 36. As a result, a slit may open up between the stationary portion 36 and the cantilever element(s) that allows sound to pass through (or at least to a larger degree compared to the close condition). Such a slit can be formed when the cantilever structure (the movable shutter portion 34) is deflected to either of the two opposite directions. For example, in FIG. 1*b*, an open condition is provided when the cantilever structure (having at least one cantilever element) is bent upwards and downwards.

During one period (2π radians) of the second actuation signal S2, the cantilever structure can move in both opposite directions and therefore can provide two open conditions within a single period of the second actuation signal S2. The shutter element 30 can therefore be used to (at least partly) attenuate the ultrasonic signal component S1-1 within the acoustic output signal SOUT, while having to oscillate at half the ultrasonic signal.

It is noted that opposite directions as described herein may refer to parallel and antiparallel movement, i.e. along a strictly straight line. The opposite directions may also refer to curved movement, such as when a movable shutter portion 34 is bent and/or rotated. The opposite directions may be defined by an initial and/or predominant direction. For example, during bending a cantilever structure may initially move in a direction perpendicular to its (initial) surface and subsequently move in a curved manner. Similarly, a plate that is rotated may initially move in a direction perpendicular to its unrotated (undeflected) surface and subsequently move in a curved manner.

As can be seen in FIG. 1*b*, the transducer element 20 (or a membrane or cantilever structure thereof) and the shutter element 30 (or a cantilever or disc structure thereof) may be arranged in a common plane (e.g., parallel to the acoustic aperture 12 or a wall of the housing 10 that has the acoustic aperture 12). The transducer element 20 and the shutter element 30 may be arranged spatially separate or may be structurally connected.

FIG. 1*b* shows an embodiment, where the housing 10 is formed in one piece. The housing 10 may, for example, be arranged on top of a substrate. However, the housing 10 may be formed from a plurality of components. For example, at least a portion of the housing 10 may be formed within one or more substrates.

FIG. 1*c* shows an exemplary schematic cross-sectional view of a speaker device 100, e.g., a MEMS micro speaker, according to an embodiment. The speaker device 100 comprises a first substrate 14*a* and a second substrate 14*b* (or side walls). The housing 10 (in combination with the transducer element 20 and the shutter element 30) surrounds a first cavity 16*a*, which forms a fluidic connection between the transducer element 20 and the shutter element 30. The first cavity 16*a* enables a portion of the acoustic path 32 from the transducer element 20 to the acoustic aperture 12. The first cavity 16*a* may be formed by a substrate removing procedure such as etching. The speaker device 100 further comprises a first substrate 14*a* that supports the second substrate 14*b*. The first substrate 14*a* may also form a part of the housing 10 as shown in FIG. 1*c*. Alternatively, the first cavity 16*a* may be formed within the second substrate 14*b*. Furthermore, the speaker device 100 may comprise a single substrate.

The housing 10 further surrounds (in combination with the transducer element 20) a second cavity 16*b*. The second cavity 16*b* may be closed, where the second cavity 16*b* may comprise at least one opening (a ventilation hole) through the transducer element 20 and/or through the housing 10. The housing 10 further surrounds (in combination with the shutter element 30) a third cavity 16*c*. The third cavity 16*c* can have an opening in form of the acoustic aperture 12.

The transducer element 20 and the shutter element 30 may share a common layer element 18. The common layer element 18 can be attached to and sectioned by a section stator 22 that has fixedly attached to the housing 10 (or is a part of the housing 10). As a result, the common layer element 18 is not deflectable at a region that is attached to the section stator 22. The transducer element 20 comprises one section of the common layer element 18 (e.g., in form of a membrane structure) and the shutter element 30 comprises another section of the common layer element 18 (e.g., in form of a cantilever structure). Alternatively, the transducer element 20 and the shutter element 30 may be realized in another form.

The speaker device 100 may be arranged on (or comprise) a chip device. Such a chip-device may have a width in a range of 2 mm to 5 mm, length in a range of 2 mm to 5 mm, and a height in a range of 200 μm to 700 μm (e.g., 300 μm to 400 μm). For example, the chip-device may have an area of 10 mm2 (e.g., with a width and length in a range of 3 mm to 4 mm). The chip device may comprise a plurality of speaker devices 100, e.g., arranged in an array.

The speaker device 100 may comprise a substrate (e.g., a printed circuit board substrate), e.g., with a thickness of 200 μm to 400 μm. The substrate may be dimensioned equally or larger than the housing 10, e.g., 3 mm to 6 mm in length and/or width. The housing may have a height (e.g., perpendicular to a surface of the substrate) in a range of 0.5 mm to 2 mm.

The shutter element 30 may have a width in a range of 50 μm to 500 μm and/or a length in a range of 50 μm to 500 μm. The one or more movable shutter elements 34 may have a width in a range of 50 μm to 500 μm and/or a length in a range of 50 μm to 500 μm. The one or more movable shutter elements 34 may have a thickness in a range of 1 μm and 6 μm or a thickness smaller than 1 μm.

Figure 2A:
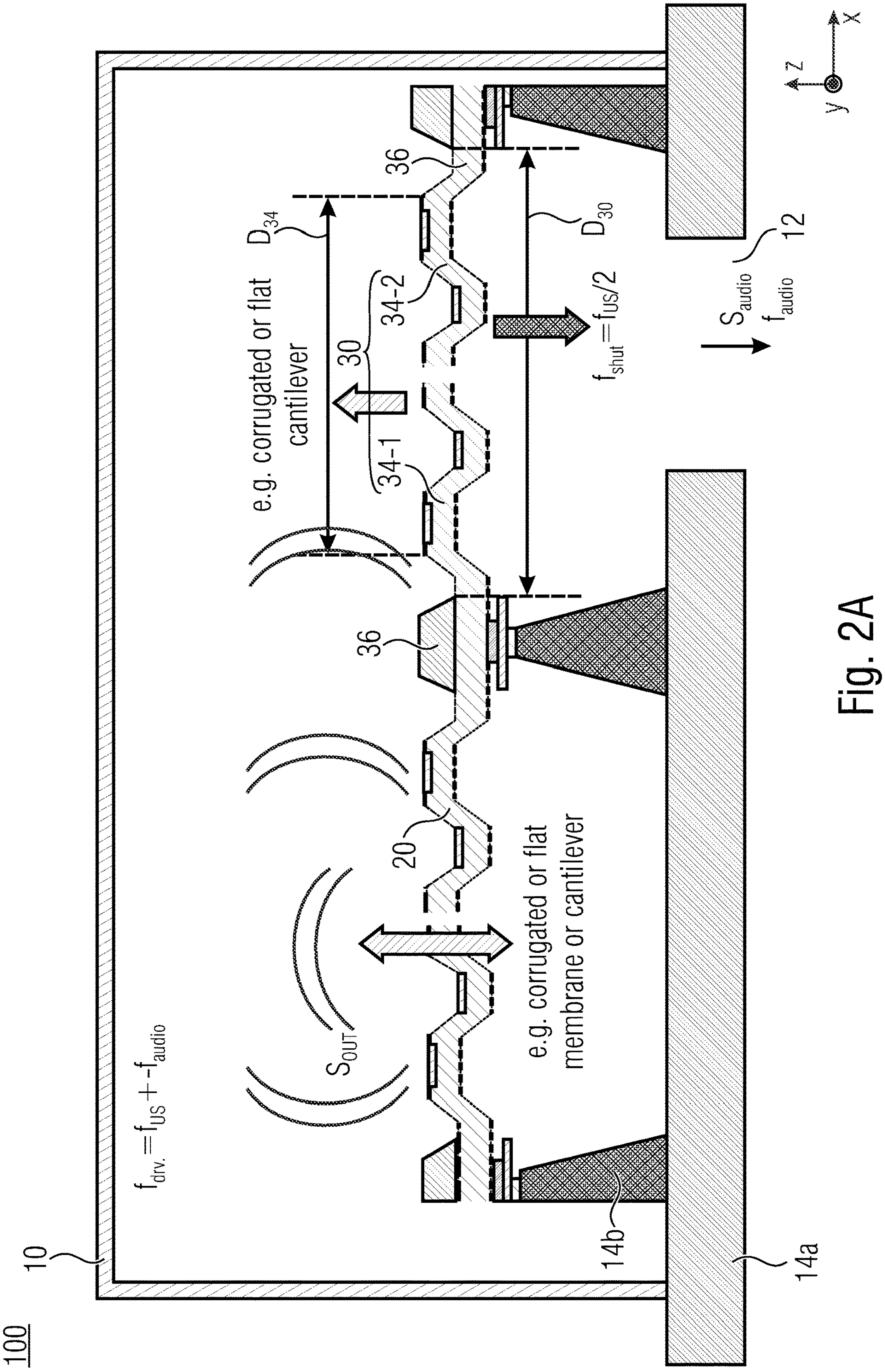
FIG. 2*a* shows an exemplary schematic cross-sectional view of a speaker device, e.g., a MEMS micro speaker, according to an embodiment.
Figure 2B:
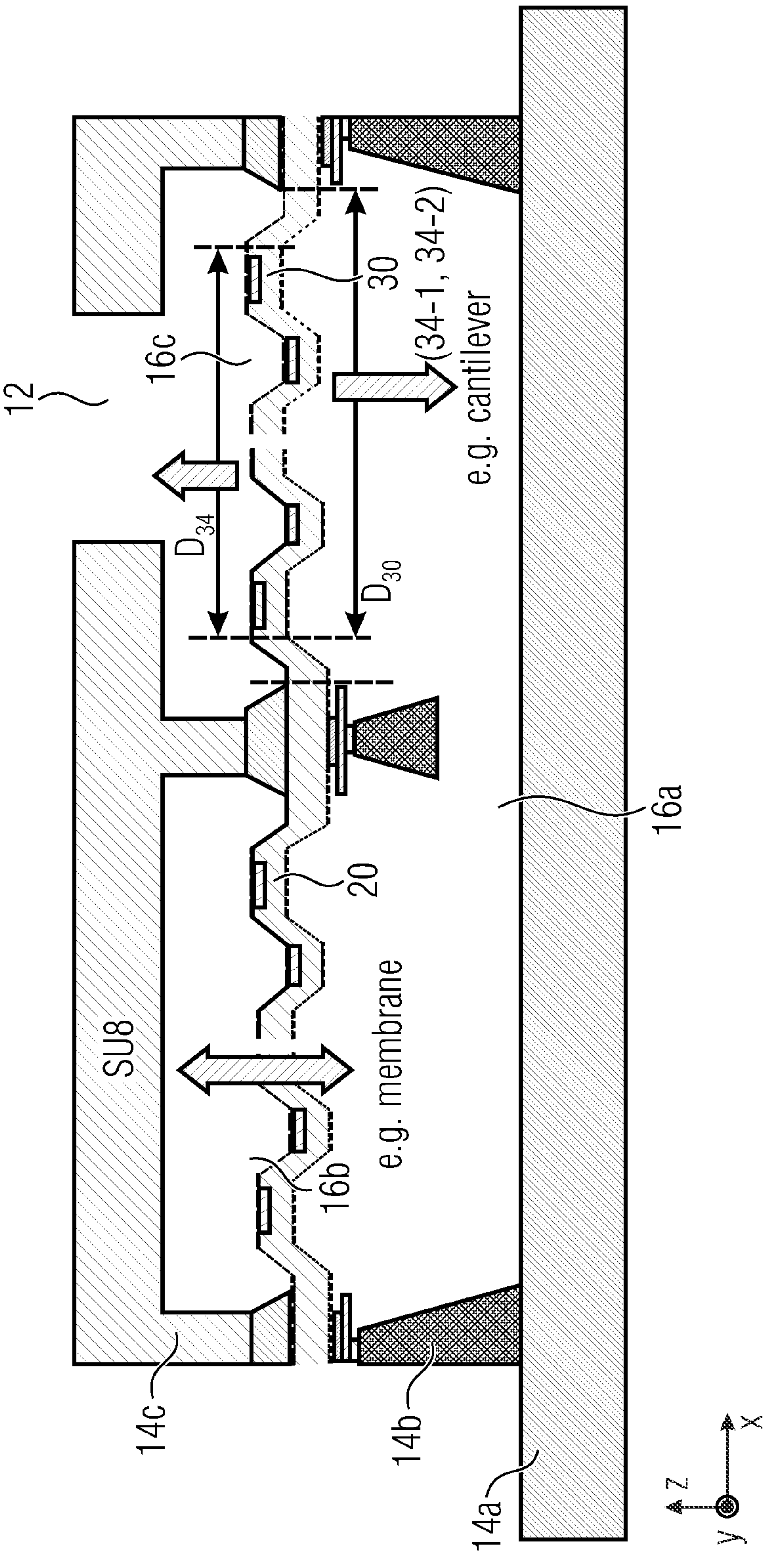
FIG. 2*b* shows an exemplary schematic cross-sectional view of a speaker device, e.g., a MEMS micro speaker, according to an embodiment.
Figure 2C:
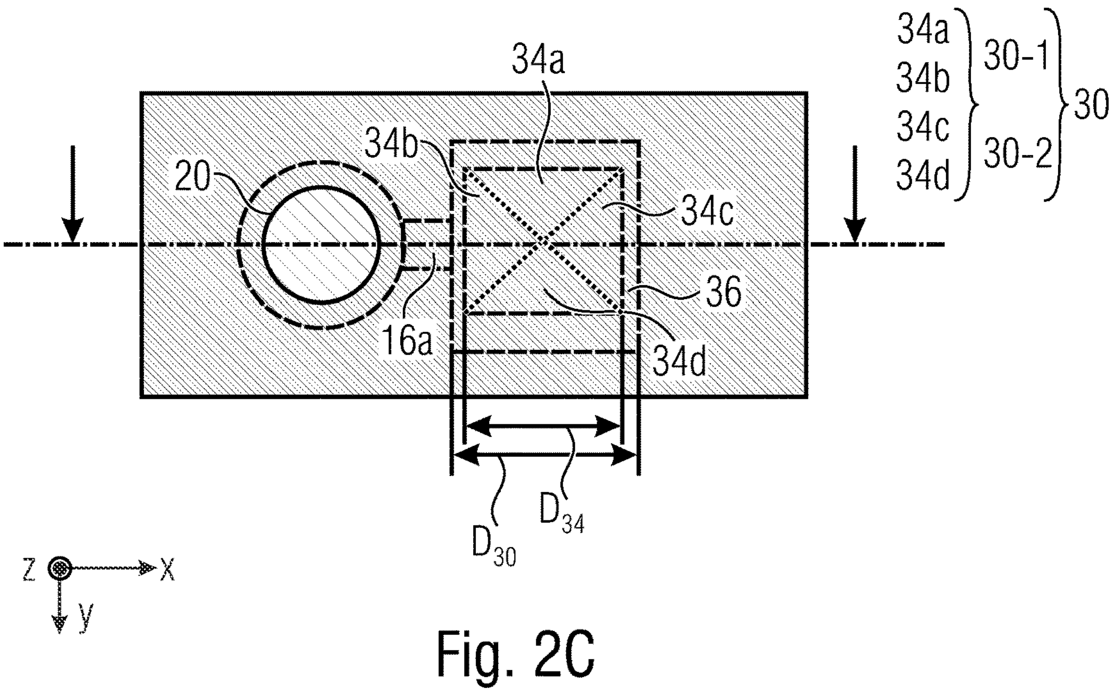
FIG. 2*c* shows an exemplary schematic plane view of the speaker device, e.g., a MEMS micro speaker, of FIG. 2*b*, according to an embodiment.

The above description of FIGS. 1*a*-*c* of the elements of the speaker device 100 and of the functionality thereof may be applicable to the corresponding elements of the speaker device 100 of FIGS. 2*a*-2*c*.

FIG. 2*a* shows an exemplary schematic cross-sectional view of a speaker device 100, e.g., a MEMS micro speaker, according to an embodiment.

The shutter element 30 may comprise a first and second movable shutter portion 34-1, 34-2, which are movable in (vertically) opposite directions (see upwards and downwards arrows in FIG. 2*a*) in response to the second actuation signal S2, where the first movable shutter portion 34-1 comprises or is formed by a first (piezo-electrically actuated) cantilever element or a first group of cantilever elements, and the second movable shutter portion 34-2 comprises or is formed by a second (piezo-electrically actuated) cantilever element or a second group of cantilever elements, and where the first and second movable shutter portions 34-1, 34-2 are arranged laterally adjacent to each other.

The first and second movable shutter portion 34-1, 34-2 can be arranged in a common plane when unbiased. Alternatively, the first and second movable shutter portion 34-1, 34-2 may be arranged out of a common plane when unbiased, but deflectable into a common plane (e.g., due to the second actuation signal). The first and second movable shutter portion 34-1, 34-2 realize a closed condition when arranged in a common plane (e.g., such as shown in FIG. 2*a*) and realize an opened condition when at least one of the first and second movable shutter portions 34-1, 34-2 is moved out of the common plane.

The second actuation signal S2 may cause the first the first and second movable shutter portions 34-1, 34-2 to move in the same one of the two opposite (vertical) directions. For example, in FIG. 2*a*, the first and second movable shutter portions 34-1, 34-2 may be configured to move upwards (+z-direction-vertically up) at the same time and move downwards (−z-direction-vertically down) at the same time. Such actuation may reduce device complexity and lower overall torque in the device.

Alternatively, the second actuation signal may cause the first and second movable shutter portions 34-1, 34-2 to move in different ones of the two opposite (vertical) directions. For example, in FIG. 2*a*, when the first movable shutter portion 34-1 moves up, the second movable shutter portion 34-2 moves down and vice versa. Such actuation may increase a ratio between a maximum and minimum of the shutter impedance. To this end, two second actuation signals S2 may be generated that are, for example, offset by half a period (e.g., offset by π radians; e.g., phase reversal).

Alternatively, a polarization of actuators (e.g., terminals of piezo-electric actuators) of the first and second movable shutter portions 34-1, 34-2 may be inverse. Further alternatively, the speaker device 100 (e.g., the shutter element 30) may have an integrated circuit (ASIC) for switching polarity or applying an offset of half a period. Unintended emission of ultrasound by the shutter element 30 may be reduced or avoided by the counter phase (e.g., due to destructive interference between ultrasound generated by the first and second movable shutter portions 34-1, 34-2). Furthermore, movement of the first and second movable shutter portions 34-1, 34-2 may result in a larger air gap therebetween and there-fore a larger change of the shutter impedance.

The housing (structure) 10 may comprise a lid element and can be include one or more substrates that are mechanically connected or bonded.

The device 100 in FIG. 2*a* comprises a first substrate 14*a* (e.g., a printed circuit board or semiconductor) and a second substrate 14*b* (e.g., a semiconductor such as silicon or poly-Si), where the second substrate 14*b* is attached to the first substrate 14*a* (e.g., by an adhesive of by formation of the second substrate 14*b* by material deposition onto the first substrate 14*a*). The second substrate 14*b* comprises an opening that forms an acoustic aperture 12. In the example shown in FIG. 2*a*, the second substrate 14*b* is formed in a plate structure, where material of the second substrate 14*b* has been removed (e.g., by wet or dry etching) in order to form the acoustic aperture 12 and a cavity below the transducer element 20. For example, the transducer element 20 and the shutter element 30 may have been formed (e.g., by material deposition) on top of the second substrate 14*b* (and optionally intermittent layers that may be at least partially removed), whereupon the acoustic aperture 12 and the cavity under the transducer element 20 are formed.

The first and second movable shutter portions 34-1, 34-2 have in combination a smaller lateral extension (diameter) than the acoustic aperture 12 and/or a cross-sectional area D30 of an acoustic path. The smaller lateral extension of the first and second movable shutter portions 34-1, 34-2 may reduce the risk of particle contamination (e.g., dust). The first and second movable shutter portions 34-1, 34-2 may not necessarily interact with the first and second substrates 14*a, b* in order to form closed and open conditions. Therefore, the first and second movable shutter portions 34-1, 34-2 can be arranged more freely (e.g., with a large enough gap relative to the first and second substrates 14*a, b*) in order to reduce gap formation that may be susceptible to particle contamination. Alternatively, the first and second movable shutter portions 34-1, 34-2 may have in combination a larger lateral extension (diameter) than the acoustic aperture 12 (e.g., as shown schematically in FIG. 2*a*).

As can be seen in FIG. 2*a*, the speaker device 100 may use a planar or non-planar (e.g., corrugated) piezo-electrical actuated transducer element 20, e.g., in the form of a membrane or cantilever driver (transducer with the deflectable structure), and a planar or non-planar (e.g., corrugated) piezo-electrical actuated shutter element 30. The transducer element (driver) 20 and the shutter element 30 may be arranged in the housing 10 laterally offset to each other and in a neighboring or adjacent position.

The first actuation signal S1 (having the frequency fdrv) can have an ultrasonic signal component S1-1 (as a carrier signal having the frequency fUS) which is modulated with an audio signal component S1-2 having the frequency faudio. The output signal Sout therefore can comprise soundwaves with a frequency (pattern) fdrv. generated by driving the transducer element 20 with the first actuation signal S1, where the frequency (pattern) fdrv. comprises a combination of an ultrasound frequency (pattern) fUS and an audio frequency (pattern) faudio. The frequency fshut of the second actuation signal S2 is half the ultrasound frequency fUS of the carrier signal S1-1. Based on the demodulating functionality of the shutter element 30 (with respect to the output signal Sout having fdrv from the transducer element 20), the micro speaker 100 can provide the acoustic output signal S2 having the audio frequency faudio as acoustic output signal at the acoustic aperture 12.

FIG. 2*b* shows an exemplary schematic cross-sectional view of a speaker device 100, e.g., a MEMS micro speaker, according to a further embodiment. The speaker device 100 comprises a first substrate 14*a*, a second substrate 14*b*, and a third substrate 14*c*. The first substrate 14*a* may comprise a semiconductor material (e.g., silicon) or a dielectric material. The second substrate 14*b* may comprise the same or a different semiconductor material or dielectric material. The third substrate 14*c* may comprise a semiconductor material, a dielectric material or a photoresist such as SU-8.

A portion of the second substrate 14*b* is removed (e.g., by wet or dry etching) in order to form (in combination with a transducer element 20 and a shutter element 30) the first cavity 16*a*. The third substrate 14*c* forms (in combination with the transducer element 20) the second cavity 16*b*. The third substrate 14*c* forms (in combination with the shutter element 30) the third cavity 16*c*.

FIG. 2*c* shows an exemplary schematic plane view of the speaker device, e.g., a MEMS micro speaker, of FIG. 2*b*. The schematic plane view shows an exemplary circular membrane structure of the transducer element 20. The shutter element 30 may comprise, for example, four (4) cantilever elements 34*a*, 34*b*, 34*c*, 34*d*, where the cantilever elements 34*a*, 34*b* form the first shutter portion 34-1 and the cantilever elements 34*c*, 34*d* form the second shutter portion 34-2. In the example shown in FIG. 2*c*, a rectangular structure is separated (e.g., by two diagonals of the rectangular structure) into four cantilever structures 34*a-d* that have a triangular shape.

The second actuation signal S2 may cause the first and second movable shutter portions 34-1, 34-2 (cantilever elements 34*a*, 34*b*, 34*c*, 34*d*) to move in the same one of the two opposite directions (e.g., move (vertically) in unison in a positive z-direction and in unison in a negative z-direction). Alternatively, the shutter element 30 may comprise two sets (pairs) of cantilever elements 34*a*, 34*b* and 34*c*, 34*d*, where the cantilever elements of each set move in unison, but the two sets of cantilever elements move in opposite phase relative to each other. For example, the first movable shutter portion 34-1 may comprise a first set (pair) of cantilever elements 34*a*, 34*b* and the second movable shutter portion 34-2 may comprise a second set (pair) of cantilever elements 34*c*, 34*d* (e.g., two neighboring or two opposite movable cantilever elements can belong to the same set. The first set may be configured to move with an offset of half a period relative to the second set.

The shutter element 30 may span a cross-sectional area D30 of an acoustic path. The movable shutter portion 34 may have a lateral extension D34. For example, the cantilever elements 34*a*, 34*b*, 34*c*, 34*d* (and slits in between) may span the lateral extension D34. The lateral extension D34 may be smaller than the cross-sectional area D30. The cantilever elements 34*a*, 34*b*, 34*c*, 34*d* (or generally moveable shutter portions) themselves may span a smaller area than the lateral extension D34, as the lateral extension includes an area of the cantilever elements 34*a*, 34*b*, 34*c*, 34*d* as well as slits (or gaps or recesses) between the cantilever elements 34*a*, 34*b*, 34*c*, 34*d*.

Figure 3A:
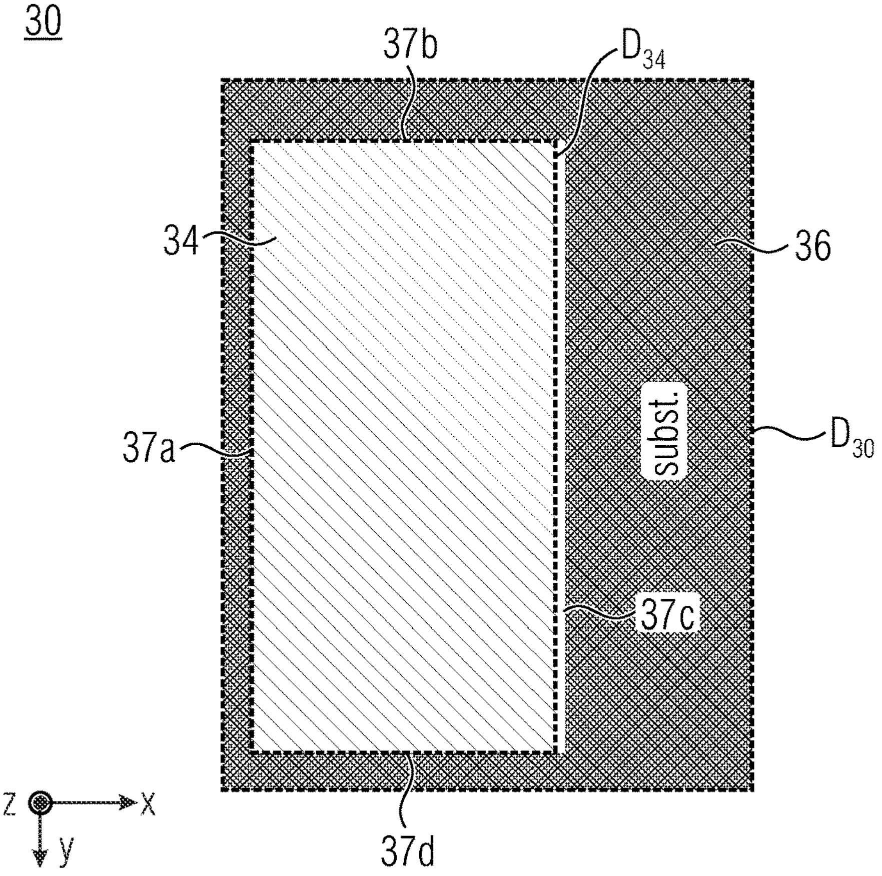
FIG. 3*a* shows an exemplary schematic cross-sectional view of a shutter element with a single movable portion (e.g. a single cantilever element) of a speaker device according to an embodiment.

FIG. 3*a* shows an exemplary schematic cross-sectional view of a shutter element 30 with a single movable shutter portion 34 (e.g., a single cantilever element) of the micro speaker 100 according to an embodiment. The movable shutter portion 34 can have a rectangular shape. However, the movable shutter portion 34 may have any other shape such as a (e.g., isosceles and/or right) triangle, a square, at least a part of a circle or ellipsis, or polygon.

The movable shutter portion 34 has a connecting edge 37*a*, at which the movable shutter portion 34 is connected to a stationary portion 36 of the antenna device 100 such as the housing 10. The movable shutter portion 34 may be connected along its entire connecting edge 37*a* or a part thereof (e.g., at least 25%, 50%, or 75% of its connecting edge). The movable shutter portion 34 can have three free standing edges 37*b*, 37*c*, 37*d*, at which the movable shutter portion 34 can be unconnected to a stationary portion 36. As a result, the movable shutter portion 34 can move in two opposite directions (e.g., vertically in positive and negative z-direction).

The movable shutter portion 34 can have a lateral extension D34 and the shutter element 30 may span a cross-sectional area D30 of an acoustic path. The lateral extension D34 may be smaller than the cross-sectional area D30. For example, the lateral extension D34 may have a shape of a rectangle with a first width and a second width and the cross-sectional area D30 may have a rectangular area with a second width and a second length, where the first width is smaller than the second width and the first length is smaller than the second length. However, the smaller lateral extension D34 and the cross-sectional area D30 may have any other shape.

Figure 3D:
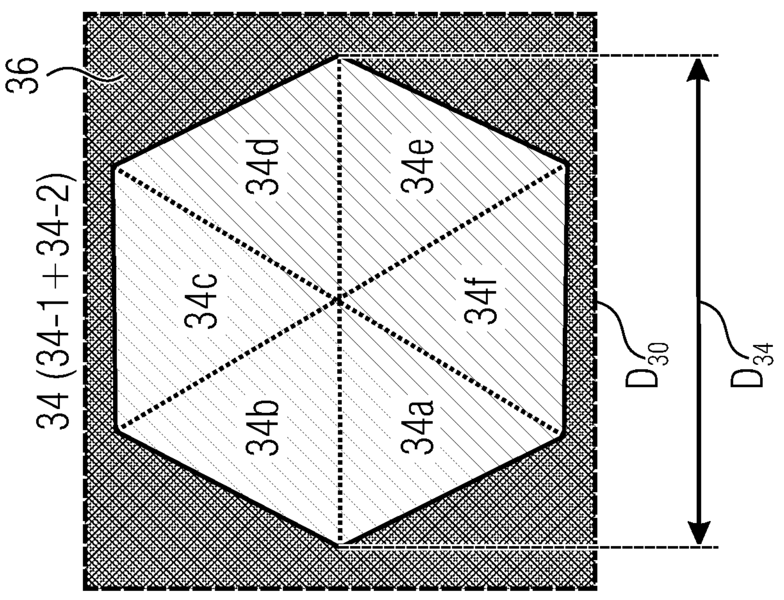
FIG. 3*d* shows an exemplary schematic plane view (top view) of a shutter element having (at least) two movable portions (e.g., six cantilever elements) of the speaker device according to an embodiment.
Figure 3C:
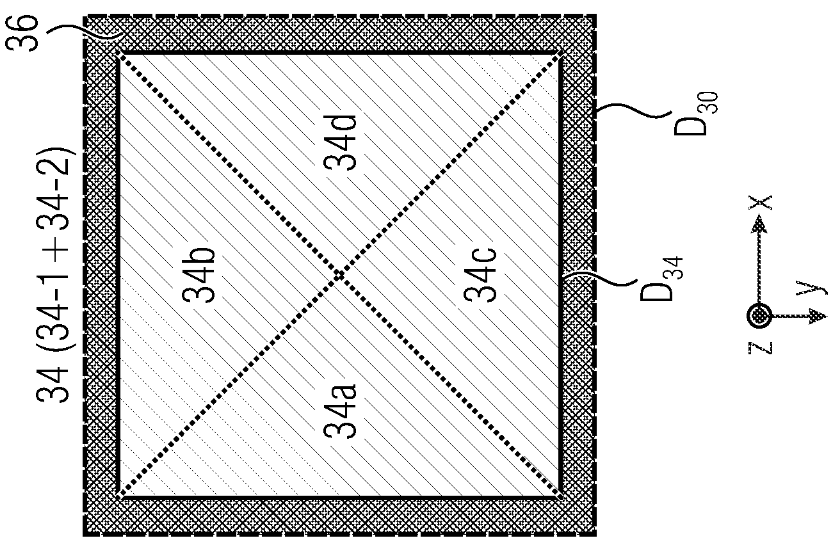
FIG. 3*c* shows an exemplary schematic plane view (top view) of a shutter element having (at least) two movable portions (e.g., four cantilever elements) of the speaker device according to an embodiment.
Figure 3B:
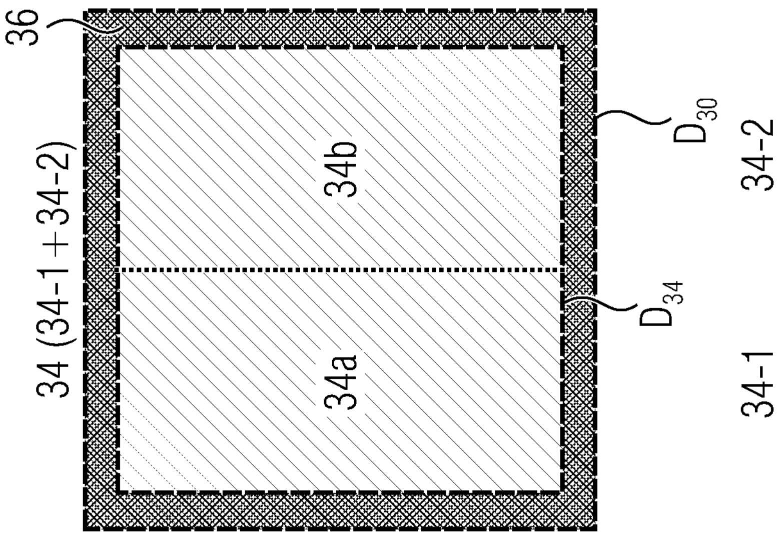
FIG. 3*b* shows an exemplary schematic plane view (top view) of a shutter element having two movable portions (e.g., two cantilever elements) of the speaker device according to an embodiment.

FIG. 3*b* shows an exemplary schematic plane view (top view) of a shutter element 30 having two shutter movable portions 34-1, 34-2 (e.g., two cantilever elements 34*a*, 34*b*) of the micro speaker 100 according to an embodiment. The cantilever elements 34*a*, 34*b* may be formed at least similarly as the movable shutter portion 34 described with reference to FIG. 3*a* (taking into account a mirror symmetry between movable portions 34-1, 34-2).

FIG. 3*c* shows an exemplary schematic plane view (top view) of a shutter element 30 having (at least) two movable portions 34-1, 34-2 (e.g. four cantilever elements 34*a*, 34*b*, 34*c*, 34*d*) of the micro speaker 100. The movable shutter portions 34-1, 34-2 may be formed at least similarly as the movable portions described with reference to FIG. 2*c*. The cantilever elements 34*a*, 34*b*, 34*c*, 34*d* of the movable shutter portions 34-1, 34-2 may be formed as isosceles and right triangles, where the base of each triangle forms connecting edge (e.g., in FIG. 3*c* outer edges of a square formed by a combination of the cantilever elements 34*a*, 34*b*, 34*c*, 34*d*). Diagonal lines separating the square may form free standing edges. For example, the first movable shutter portion 34-1 may comprise a first set (pair) of cantilever elements 34*a*, 34*b* and the second movable shutter portion 34-2 may comprise a second set (pair) of cantilever elements 34*c*, 34*d* (e.g., two neighboring or two opposite movable cantilever elements can belong to the same set).

FIG. 3*d* shows an exemplary schematic plane view (top view) of a shutter element 30 having (at least) two movable portions 34-1, 34-2 (e.g., six cantilever elements 34*a*-34*f*) of the micro speaker 100. The cantilever elements 34*a-f* can have a triangular shape (e.g., an equilateral triangle), where the cantilever elements 34*a-f* are arranged to form together a hexagonal shape. The outer edges of the hexagonal shape may form connecting edges and diagonal lines of the hexagonal shape may form free standing edges. For example, the first movable shutter portion 34-1 may comprise a first set (pair) of cantilever elements 34*a*, 34*b*, 34*c* and the second movable shutter portion 34-2 may comprise a second set (pair) of cantilever elements 34*d*, 34*e*, 34*f* (e.g., respectively three neighboring movable cantilever elements can belong to the same set).

Figure 4B:
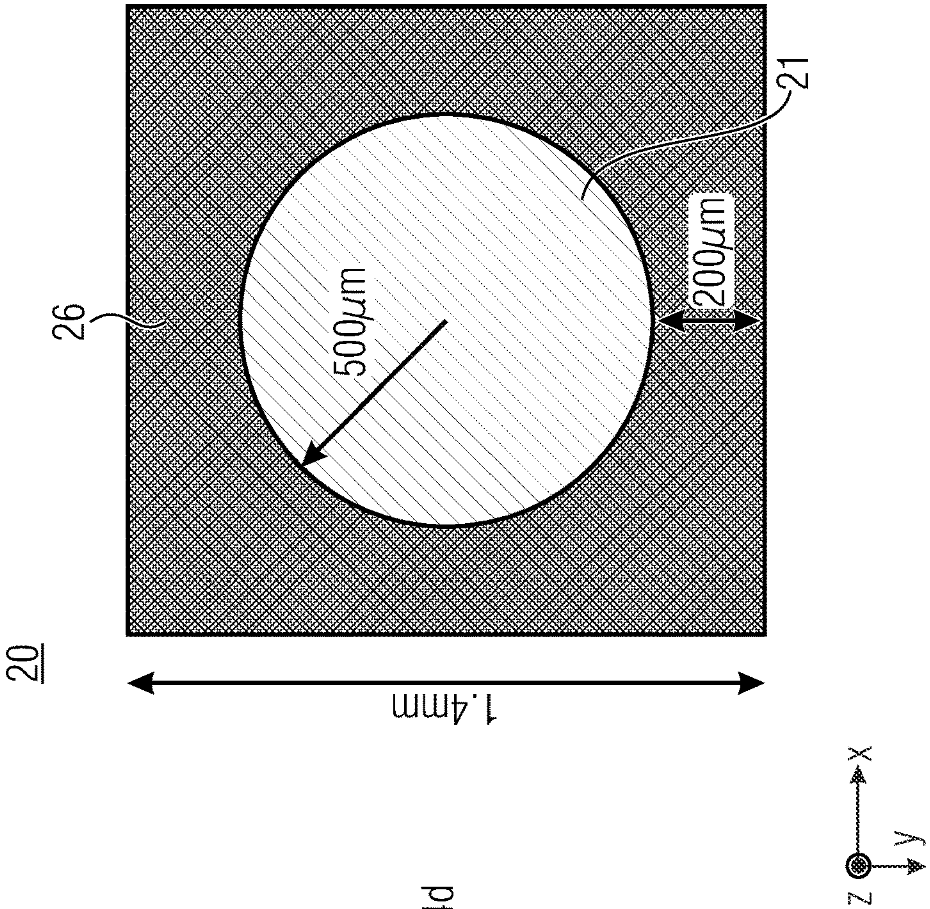
FIG. 4*b* shows an exemplary schematic plane view (top view) of a transducer element of the speaker device according to an embodiment.
Figure 4A:
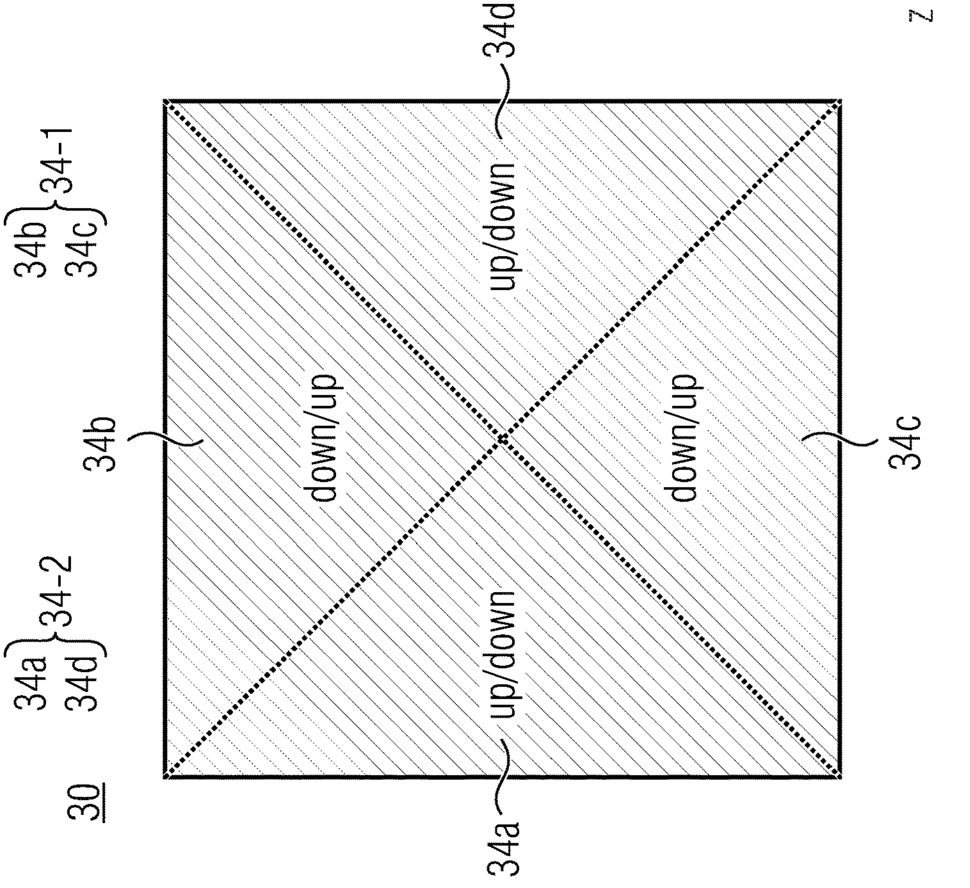
FIG. 4*a* shows an exemplary schematic plane view (top view) of a shutter element having (at least) two movable portions (e.g., four cantilever elements) of the speaker device that assigned to two sets according to an embodiment.

FIG. 4*a* shows an exemplary schematic plane view (top view) of a shutter element 30 having (at least) two movable shutter portions 34-1, 34-2 with four cantilever elements 34*a*, 34*d* and 34*b*, 34*c* of the micro speaker 100 that assigned to two sets 34-1, 34-2. The first set (e.g., the first movable shutter portion) 34-1 can comprise the cantilever elements 34*b*, 34*c* and the second set (e.g., the second movable shutter portion) 34-2 can comprise the cantilever elements 34*a*, 34*d*. The first and the second set 34-1, 34-2 may be configured to move in opposite phases (i.e. with a phase offset of half a period). For example, when the first set 34-1 moves (vertically) down (e.g., in FIG. 4*a* in negative z-direction) the second set 34-2 may move (vertically) up (e.g., in FIG. 4*a* in positive z-direction). Alternatively, when the first set 34-1 moves up, the second set 34-2 may move down.

FIG. 4*b* shows an exemplary schematic plane view (top view) of a transducer element 20 of the micro speaker 100. The transducer element 20 comprises a membrane (diaphragm) structure 21 with a circular shape. The membrane structure 21 can be clamped by a membrane stator 26 (which may comprise the section stator 22 as described with reference to FIG. 1*c*). The transducer element 20 or the membrane stator 26 may have a width (parallel to the membrane structure 21) or a diameter in a range of 0.5 mm to 3 mm, e.g., in a range of 1 mm to 2 mm, e.g., 1.4 mm. The membrane structure 21 may have a radius in a range of 100 μm to 1000 μm, e.g., in a range of 400 μm to 600 μm, e.g., 500 μm. The membrane stator 26 may comprise a frame surrounding the membrane structure 21 with a shortest thickness of 200 μm (or smaller than 200 μm, 100 μm, or 50 μm). The arrangement of the transducer element relative to the shutter element 30 can allow for a higher active area. In the example shown in FIG. 4*b*, the transducer element 20 comprises a unit cell with a width of 1.4 mm (or smaller, for example 1.2 mm, 1.1 mm, or smaller) and has a membrane structure 21 with a radius of 500 μm, resulting in an active area of approximately 40%. However, the active area may have a different percentage such as larger than 50% or 60% (e.g., 54% to 65%).

Figures 4C, 4D:
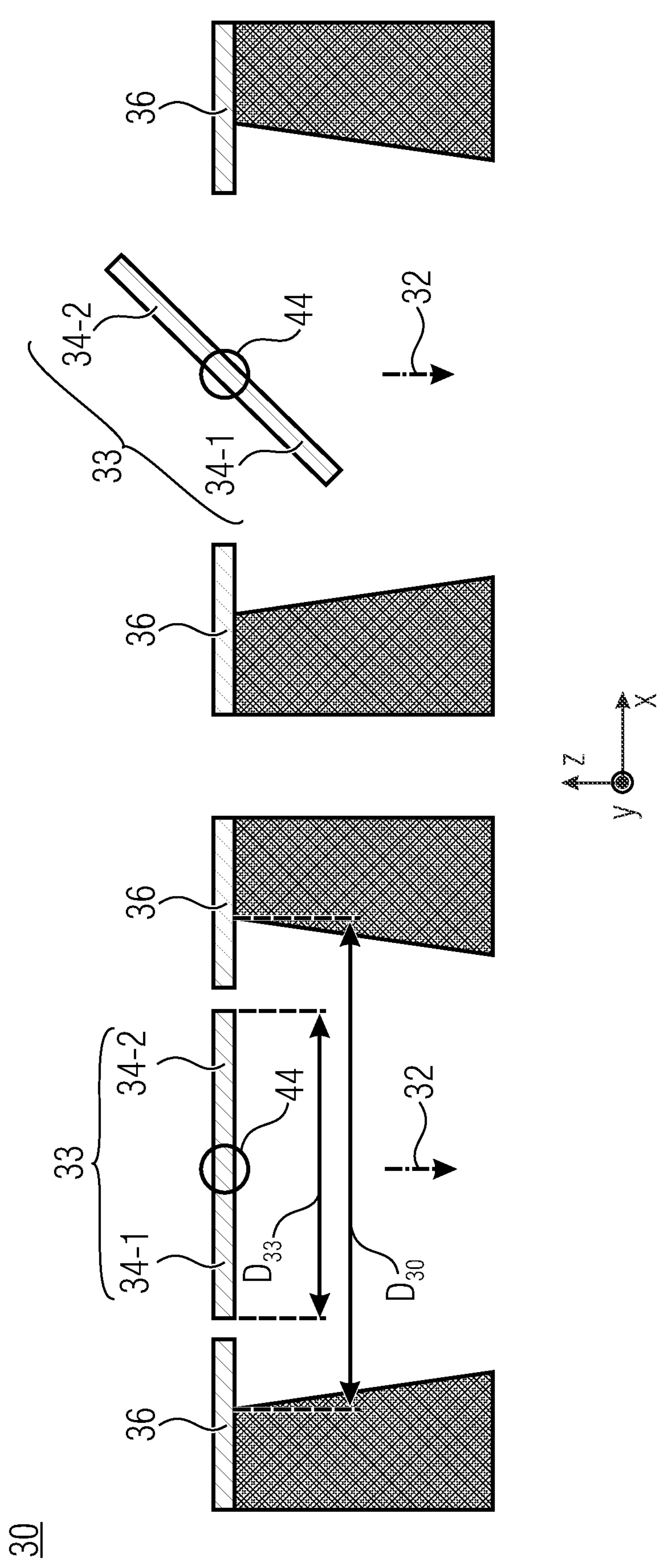
FIG. 4*c* shows an exemplary schematic cross-sectional view of a shutter element with a disc element (forming a first and second moveable shutter portion) of the speaker device according to an embodiment.
FIG. 4*d* shows an exemplary schematic cross-sectional view of the shutter element shown in FIG. 4*c* in an open condition, according to an embodiment.

FIG. 4*c* shows an exemplary schematic cross-sectional view of a shutter element 30 with a disc element 33 (forming a first and second moveable shutter portion 34-1, 34-2) according to an embodiment.

The disc element 33 is tiltable around a tilting axis 44 (rotary axis), where a first and second movable shutter portion 34-1, 34-2 of the disc element 33 extend in opposite directions from the tilting axis 44.

The tilting axis 44 may be a (bisecting) central axis through the center of gravity of the disc element 33. For example, in the case of the disc element 33 having a circular shape, the tilting axis 44 may be a diameter (i.e., a line segment passing through the center of the circular shape). In the case of the disc element 33 having a rectangular shape, the tilting axis may be a symmetry axis or diagonal of the rectangular shape.

The shutter element 30 may comprise a stationary portion 36 such as a plate of a wall. In the example shown in FIG. 4*c*, the stationary portion 36 comprises or is formed by a plate, where the plate is arranged at least at a same plane as the disc element 33, when the shutter element 30 is in the closed condition. The stationary portion 36 may have the same shape as the disc element 33, but with slightly larger dimensions (e.g., with a linear scaling factor between 1 and 1.1, between 1 and 1.05, or between 1 and 1.01) to allow movement of the disc element 33 relative to the stationary portion 36. The disc element 33 of the shutter element 30 may have a smaller lateral extension D33 (e.g., diameter) than a cross-sectional area D30 of an acoustic path 32.

FIG. 4*d* shows an exemplary schematic cross-sectional view of the shutter element 30 shown in FIG. 4*c* in an open condition.

The disc element 33 may be arranged parallel to the acoustic aperture 12 in the closed condition. The disc element 33 may be in an unbiased state in the closed condition and may be rotated into an open condition by application of a force (e.g., caused by the second actuation signal S2). Alternatively, the disc element 33 may be in the unbiased state in the closed condition and may be rotated into the closed condition by application of a force (e.g., caused by the second actuation signal). Alternatively, the disc element 33 may be unbiased (e.g., mounted on a hinge structure).

Figure 5A:
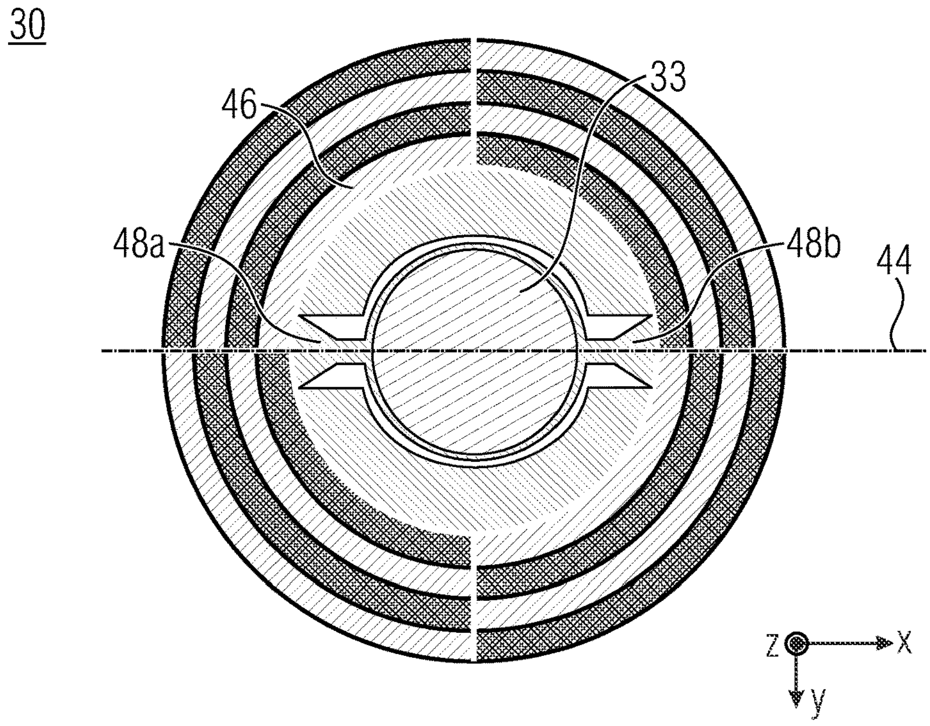
FIG. 5*a* shows an exemplary schematic plane view of an example of actuation structures of the disc-shaped shutter element of FIGS. 4*c*, 4*d* according to an embodiment.

FIG. 5*a* shows an exemplary schematic plane view of an example of actuation structures 46 of the disc-shaped shutter element of FIGS. 4*c*, 4*d* according to an embodiment.

The actuation structures 46 may comprise torsion spring structures 48*a*, 48*b*, where actuation of the actuation structures 46 causes a torsion of the torsion spring structures 48*a*, 48*b*. The torsion spring structures 48*a*, 48*b* may be coupled directly or indirectly with the disc element 33 and may be configured to transfer the torsion to the disc element 33 so as to rotate the disc element 33 around a tilting axis 44. The actuation structures 46 may be configured to generate torsion by actuating two sets of piezoelectric actuators in opposite directions.

Figure 5B:
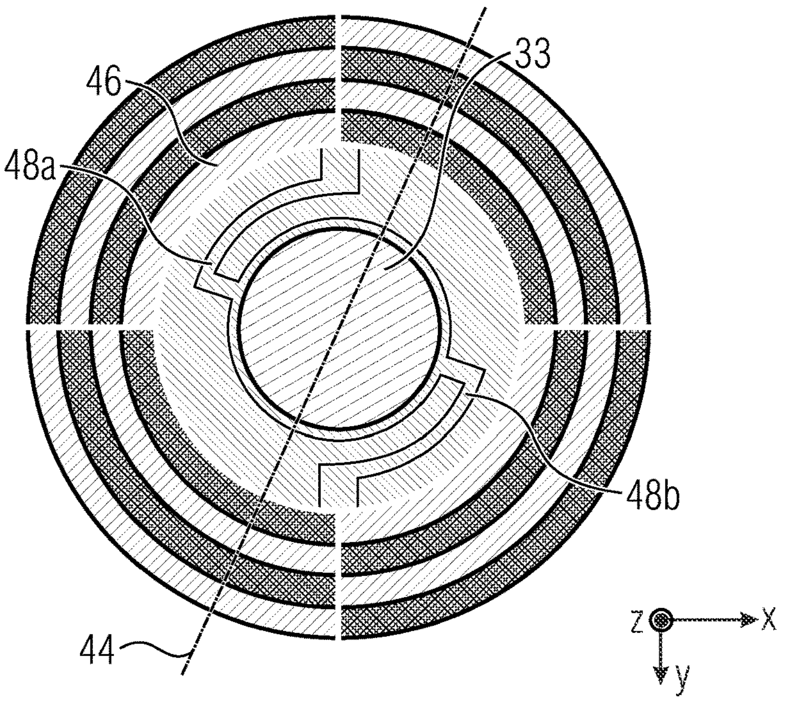
FIG. 5*b* shows an exemplary schematic plane view of an example of actuation structures of the disc-shaped shutter element of FIGS. 4*c*, 4*d* according to an embodiment.

FIG. 5*b* shows exemplary schematic plane view of an example of actuation structures 46 of the disc-shaped shutter element of FIGS. 4*c*, 4*d* according to an embodiment.

The actuation structure 46 comprise torsion spring structures 48*a*, 48*b* with a lever. Torsion of the torsion spring structure 48*a*, 48*b* causes the levers to rotate out of plane (in opposite directions) and consequently rotate the disc element 33 around a tilting axis 44.

Figure 5C:
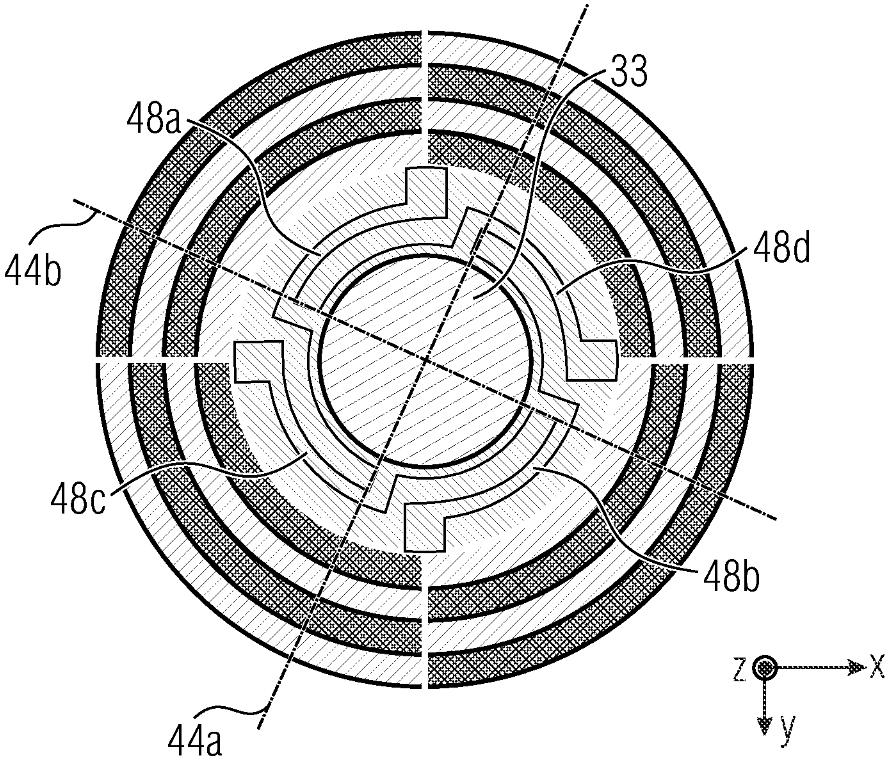
FIG. 5*c* shows an exemplary schematic plane view of an example of actuation structures of the disc-shaped shutter element of FIGS. 4*c*, 4*d* according to an embodiment.

FIG. 5*c* shows an exemplary schematic plane view of an example of actuation structures 46 of the disc-shaped shutter element of FIGS. 4*c*, 4*d* according to an embodiment.

The actuation structure 46 comprises a first set of torsion spring structures 48*a, b* and a second set of torsion spring 48*c*, 48*d*, each with a lever. The first set enables rotation of the disc element 33 around a first tilting axis 44*a*, and the second set enables rotation of the disc element 33 around a second tilting axis 44*b*. The disc element 33 can therefore have an opening at different locations of an acoustic path, which may carry sound different according to the different locations. The shutter impedance can therefore be better adjusted to the acoustic path.

FIG. 6*a* shows a schematic graphical illustration of a period of the second actuation signal S2 and the associated shutter air impedance (or fluidic impedance of the shutter element) resulting from the movement of one or more moveable shutter elements 34, 34-1, 34-2.

The horizontal axis indicates a time axis. The horizontal axis shows two parameters. In particular, the dished plot line indicates an amplitude indicative of the second actuation signal S2 (e.g., a voltage of the second actuation signal S2). The solid plot line indicates a shutter impedance resulting from the second actuation signal S2. The time axis is separated into five time segments 50*a-e* that relate to open and close conditions of the shutter element 30.

FIGS. 6*b* to 6*f* show schematic cross sections of different embodiments of shutter elements in correlation to the time segments 50*a-e* of FIG. 6*a*.

FIG. 6*b* shows a schematic cross section of a shutter element 30 with a single cantilever structure 34 and stationary portion 36 comprising a plate portion.

FIG. 6*c* shows a schematic cross section of a shutter element 30 with a single cantilever structure 34 and a stationary portion 36 comprising a wall portion.

FIG. 6*d* shows a schematic cross section of a shutter element 30 with two cantilever structures 34*a*, 34*b* that are moving in phase.

FIG. 6*e* shows a schematic cross section of a shutter element 30 with two cantilever structures 34*a*, 34*b* that are moving in counter phase.

FIG. 6*f* shows a schematic cross section of a shutter element 30 with a disc element 33 which is tiltable around a tilting axis.

All of the examples shown in FIGS. 6*b*-6*f* show cantilever structures for the movable shutter portion(s) 34, 34-1, 34-2 that cause a close condition when no second application signal is applied. For example, cantilever structures may be straight when unbiased and the disc element 33 may be biased to be oriented parallel to the wall portions of the stationary portion 36. However, the movable shutter portion may have any other bias (e.g., biased into an open condition).

In the beginning of the first time segment 50*a*, the amplitude of the second actuation signal S2 can be zero. As a result, the movable shutter portions 34, 34-1, 34-2 can be aligned with a static plate 36 (see FIGS. 6*b*, 6*f*), closest to a wall portion (see FIG. 6*c*), or aligned with another movable shutter portion (see FIGS. 6*d*, 6*e*). Therefore, the ability of the shutter element 30 to reduce sound (e.g., the acoustic output signal SOUT) can be increased and the shutter impedance can be high.

From the first to a second time segment 50*a*, 50*b*, the amplitude of the second actuation signal S2 increases (e.g., towards a positive value), which can cause movable shutter portions 34, 34-1, 34-2 to move gradually out of the close condition. As a result a distance between an edge of the movable shutter portion 34 and the stationary portion 36 and/or one or more other movable shutter portions 34 can increase, which opens up a gap that allows sound to better travel through. Therefore, the ability of the shutter element 30 to reduce sound (e.g., the acoustic output signal SOUT) can decrease and the shutter impedance can decrease. In the middle of the second time segment 50*b*, the shutter impedance can reach a (e.g., local) minimum and the amplitude of the second actuation signal S2 can reach a (e.g., local) maximum.

From the second to a third time segment 50*b*, 50*c*, the amplitude of the second actuation signal S2 can decrease (e.g., towards zero), which causes the at least one movable shutter portion 34, 34-1, 34-2 to move gradually into the close condition. Therefore, the ability of the shutter element 30 to reduce sound (e.g., the acoustic output signal SOUT) can increase and the shutter impedance can increase. In the middle of the third time segment 50*c*, the shutter impedance can reach a (e.g., local) maximum and the amplitude of the second actuation signal S2 can reach (at least approximately) zero.

From the third to a fourth time segment 50*c*, 50*d*, the amplitude of the second actuation signal S2 can decrease towards a negative value, which causes the at least one movable shutter portion 34, 34-1, 34-2 to gradually move into the opposite direction compared to the second time segment 50*b* (e.g., upwards in-stead of downwards in FIG. 6*b*). Therefore, the ability of the shutter element 30 to reduce sound (e.g., the acoustic output signal SOUT) can decrease and the shutter impedance can be low. In the middle of the fourth time segment 50*d*, the shutter impedance can reach a (e.g., local) minimum and the amplitude of the second actuation signal S2 can reach a (e.g., local) minimum.

From the fourth to a fifth time segment 50*d*, 50*e*, the amplitude of the second actuation signal can increase towards zero, which causes the at least one movable shutter portion 34 to gradually move into the close condition. Therefore, the ability of the shutter element 30 to reduce sound (e.g., the acoustic output signal SOUT) can increase and the shutter impedance can be high. At the end of the fifth time segment 50*e*, the shutter impedance can reach a (e.g., local) maximum and the amplitude of the second actuation signal S2 can reach a reaches (at least approximately) zero.

In summary, within one period of the intensity of the second actuation signal S2, the shutter impedance can traverse two periods. In other words, the shutter impedance can change at twice the frequency as the second actuation signal S2. The examples shown in FIGS. 6*b*-6*f* depict shutter elements that are configured to provide consecutive open and closed conditions of the acoustic path 32 based on the second actuation signal S2, where the shutter element 30 is configured to comprise two closed conditions during one period of the second actuation signal S2. Therefore, the shutter element 30 that enables the controller can be configured to provide the second actuation signal S2 that has half the frequency (divided by 2) of the ultrasonic signal component.

Figure 7A:
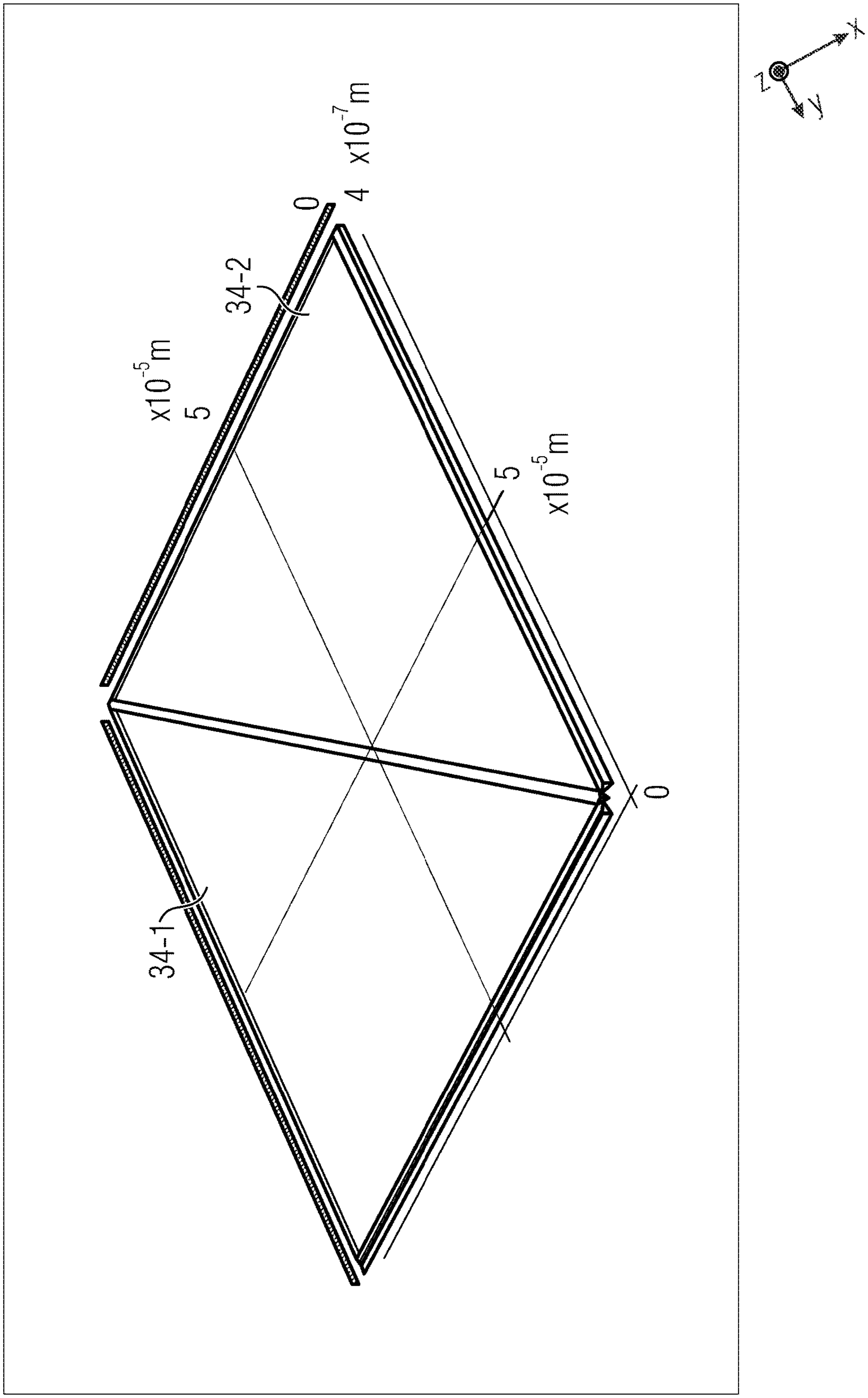
FIG. 7*a* shows a perspective view of an example of a shutter element with two movable shutter portions (e.g., two cantilever elements) of the speaker de-vice according to an embodiment.

FIG. 7*a* shows a perspective view of an example of a shutter element 30 with two movable shutter portions 34-1, 34-2. The shutter element 30 and/or the movable shutter portions (cantilever elements) 34-1, 34-2 may have a lateral extension in a range of 10 μm to 1000 μm, e.g., in a range of 100 μm to 300 μm. The example shown in FIG. 7*a* depicts a rectangular frame with an edge length of 100 μm. However, the shutter element 30 may comprise a plurality of frames as shown in FIG. 7*a*. For example, the shutter element 30 may comprise two, four, or more of such frames. In the case of four frames, the edge length may be, for example, 200 μm. The rectangular frame can be separated along its diagonal into two triangular shapes (e.g., in the shape of two isosceles right triangles), where each of the movable shutter portions 34-1, 34-2 (or cantilever elements 34*a*, 34*b*) can have a triangular shape. In the example shown in FIG. 7*a*, the movable shutter portions 34-1, 34-2 are attached to adjoining edges of the rectangular frames. For example, in the case of four frames, the shutter element 30 may comprise eight movable shutter portions 34 with a triangular shape, where tips of the eight triangular shapes meet in a center (e.g., with a distance of 100 μm to the edge). Alternatively, the movable shutter portions 34-1, 34-2 may be attached to opposite edges of the rectangular frame. The movable shutter portions 34-1, 34-2 may be separated by a gap with a width in a range of 5 to 20 μm, e.g., at least 15 μm.

Figure 7B:
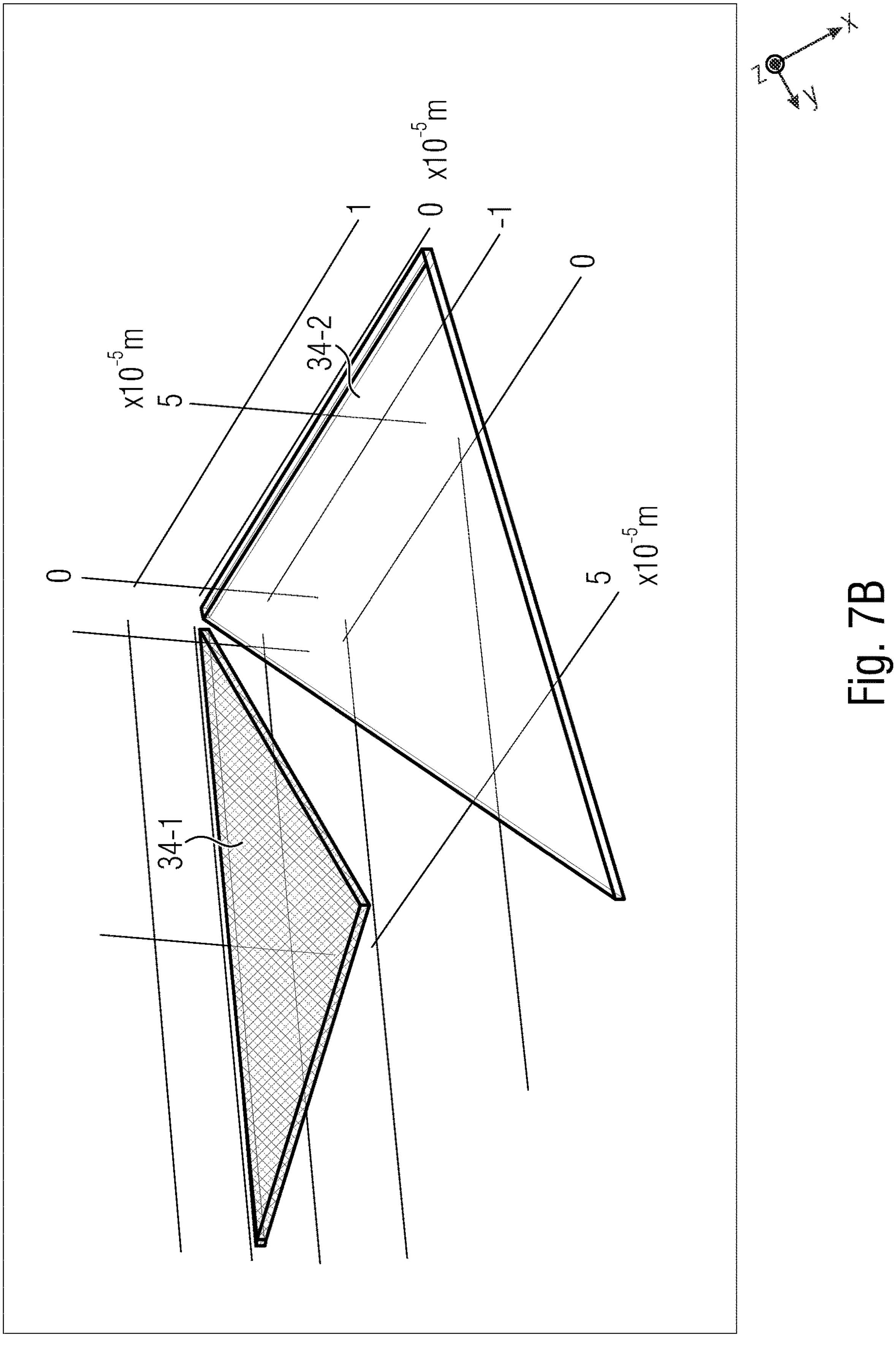
FIG. 7*b* shows a perspective view of the shutter element shown in FIG. 7*a* in an open condition, according to an embodiment.

FIG. 7*b* shows a perspective view of the shutter element 30 shown in FIG. 7*a* in an open condition. The second actuation signal S2 may be configured such that the movable shutter portions 34-1, 34-2 that a free end (e.g., an edge or point opposite an edge at which the respective movable shutter portion 34-1, 34-2 is attached) is deflected by a distance in a range of 3 to 30 μm, e.g., in a range of 8 μm to 15 μm, e.g., 10 μm. In the example shown in FIG. 7*a* vertex of the triangular shape of the movable shutter portions 34-1, 34-2 is deflected by 10 μm. Furthermore, the movable shutter portions 34-1, 34-2 can be deflected in opposite directions (e.g., in counter phase). Alternatively, the movable shutter portions 34-1, 34-2 may be deflected in the same direction (e.g., in phase).

Figure 8A:
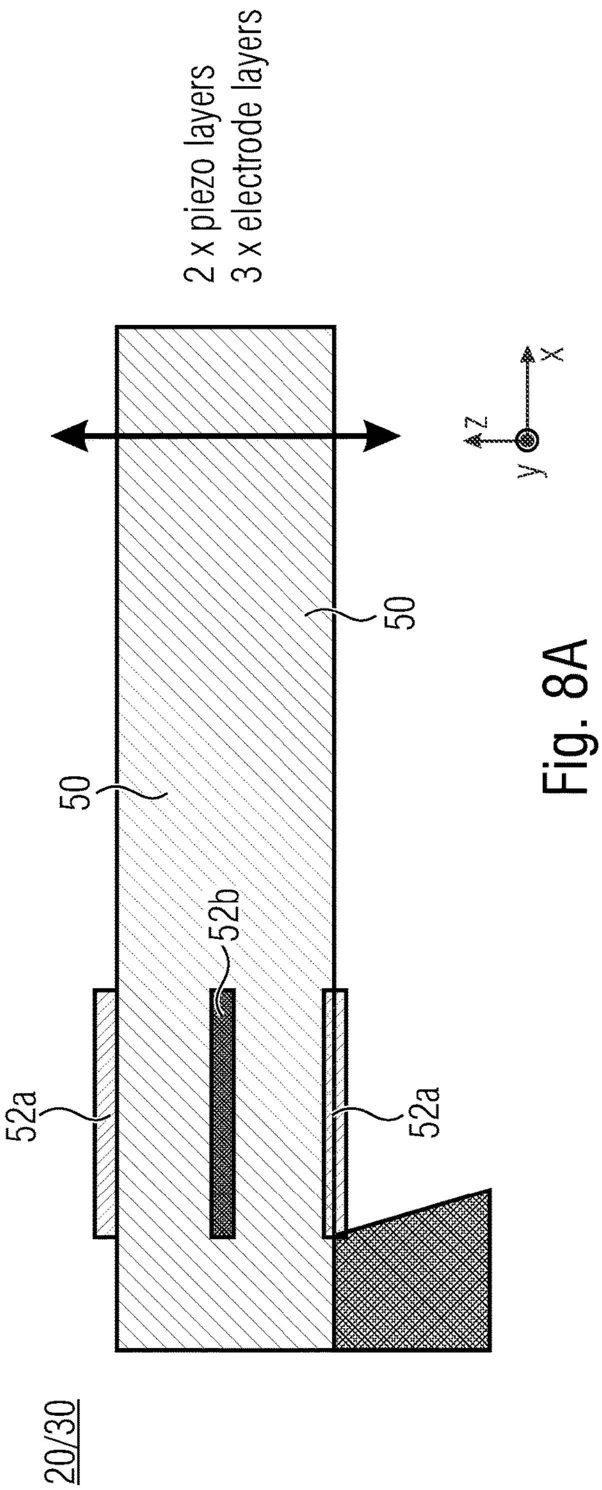
FIG. 8*a* shows an exemplary schematic cross-sectional (partial) view of an example of a movable portion of the transducer element or the shutter element, according to an embodiment.

FIG. 8*a* shows an exemplary schematic cross-sectional view of an example of a transducer element 20. However, the structures depicted in FIG. 8*a* may be used in the shutter element 30. Thus, FIG. 8*a* can depict a schematic cross-sectional (partial) view of an example of a movable (deflectable) portion (20/30) of the transducer element 20 or the shutter element 30.

The deflectable portion 20/30 can include two piezoelectric layers 50 and three electrodes 52, where an inner electrode 52*b* is arranged between the two piezoelectric layers 50 and the two piezoelectric layers 50 are arranged between the two outer electrodes 52*a*. The two piezoelectric layers 50 can be sandwiched between the two outer electrodes 52*a*. The neutral axis of the deflectable portion 20/30 is in the center plane (e.g., at the inner electrode 52*b*).

In an actuated condition, a first electrical potential is applied at the two outer electrodes 52*a* and a second (e.g., an opposite) electrical potential is applied at the inner electrode 52*b*. As a result, two opposite electrical potentials (fields) are applied in the two piezoelectric layers 50, which can cause an opposite mechanical strain (compression and torsion) in the two piezoelectric layers 50. As a result the transducer element 20 can be deflected (e.g., up or down in FIG. 8*a*). Using three electrodes 52 may increase a deflection of the transducer element 20. FIG. 8*a* shows a single set of electrodes 52. However, the transducer element 20 may comprise any number of sets of electrodes 52.

Figure 8B:
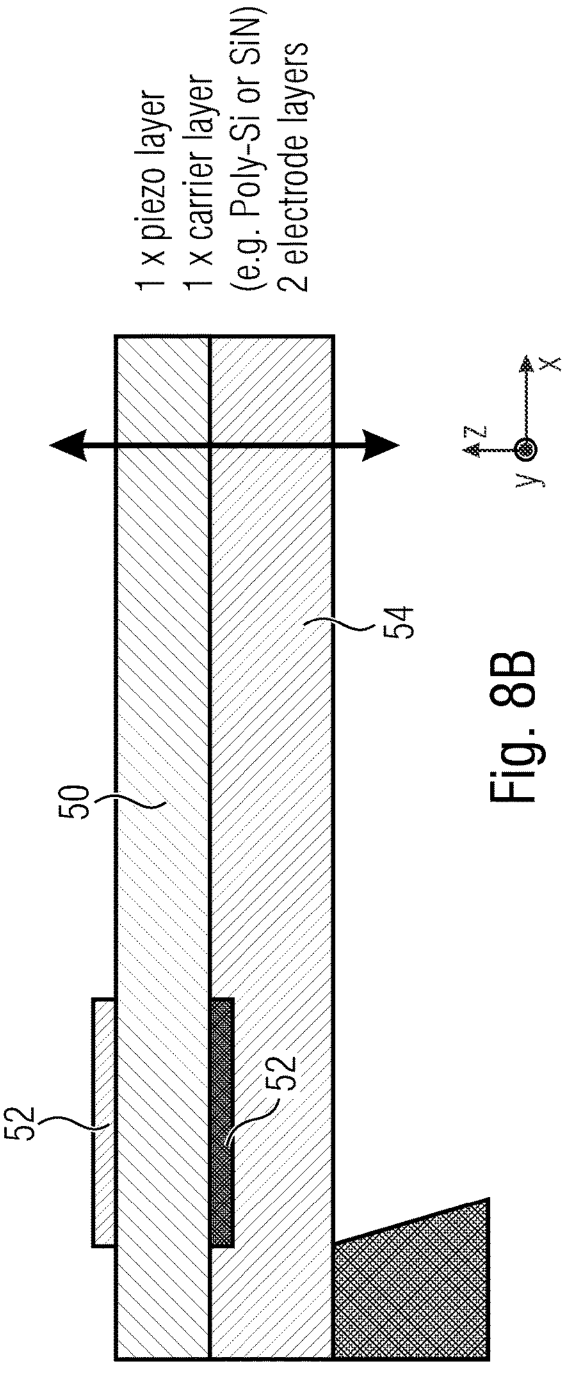
FIG. 8*b* shows an exemplary schematic cross-sectional (partial) view of another example of a movable portion of the transducer element or the shutter element, according to an embodiment.

FIG. 8*b* shows an exemplary schematic cross-sectional view of another example of a transducer element 20. However, the structures depicted in FIG. 8*b* may be used in the shutter element 30. Thus, FIG. 8*b* can depict a schematic cross-sectional (partial) view of an example of a movable (deflectable) portion (20/30) of the transducer element 20 or the shutter element 30.

The transducer element 20 can include a single piezoelectric layer 50 (sandwiched) between two electrodes 52 and an (optional) carrier layer 54 (e.g., comprising silicon or silicon nitride). An electrical field between the two electrodes 52 may cause mechanical strain in the piezoelectric layer 50 that results in a deflection of the transducer element 20. The optional carrier layer 54 may provide mechanical stability. The transducer element 20 may comprise more than the set of two electrodes 52.

Figure 8C:
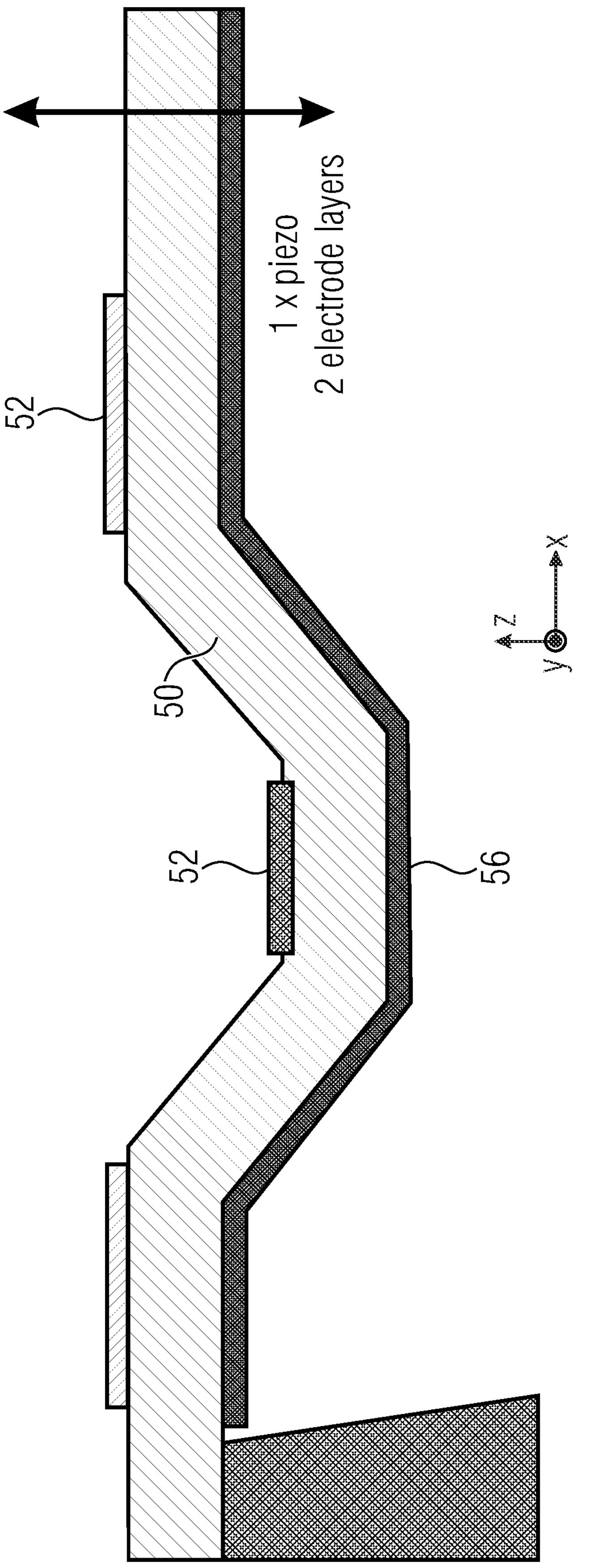
FIG. 8*c* shows an exemplary schematic cross-sectional (partial) view of another example of a movable portion of the transducer element or the shutter element, according to an embodiment.

FIG. 8*c* shows an exemplary schematic cross-sectional view of another example of a transducer element 20. However, the structures depicted in FIG. 8*c* may be used in the shutter element 30. Thus, FIG. 8*c* can depict a schematic cross-sectional (partial) view of another example of a movable portion (20/30) of the transducer element 20 or the shutter element 30.

The transducer element 20 can include one (or more) piezoelectric layer 50 with corrugations. Elevated and recessed regions of the corrugations may be provided with electrodes 52 that have (in an actuated condition) opposite electrical polarities (e.g., positive voltage at elevated recesses and negative voltage at recessed regions or vice versa). The example in FIG. 8*c* shows a common counter electrode 52. Alternatively, electrodes may be provided pairwise (e.g., as shown in FIG. 8*b*).

Actuators for the shutter element 30 (e.g., sets of electrodes applying an electrical potential or field to a piezoelectric material) may be arranged at or close to a region of a deflectable structure that is connected to (e.g., clamped) to a static structure. The deflectable structure of the transducer element 20 and/or the shutter element 30 may be attached along its entire circumference or along a part thereof. The transducer element 20 may comprise a membrane structure or a cantilever structure.

Figure 9:
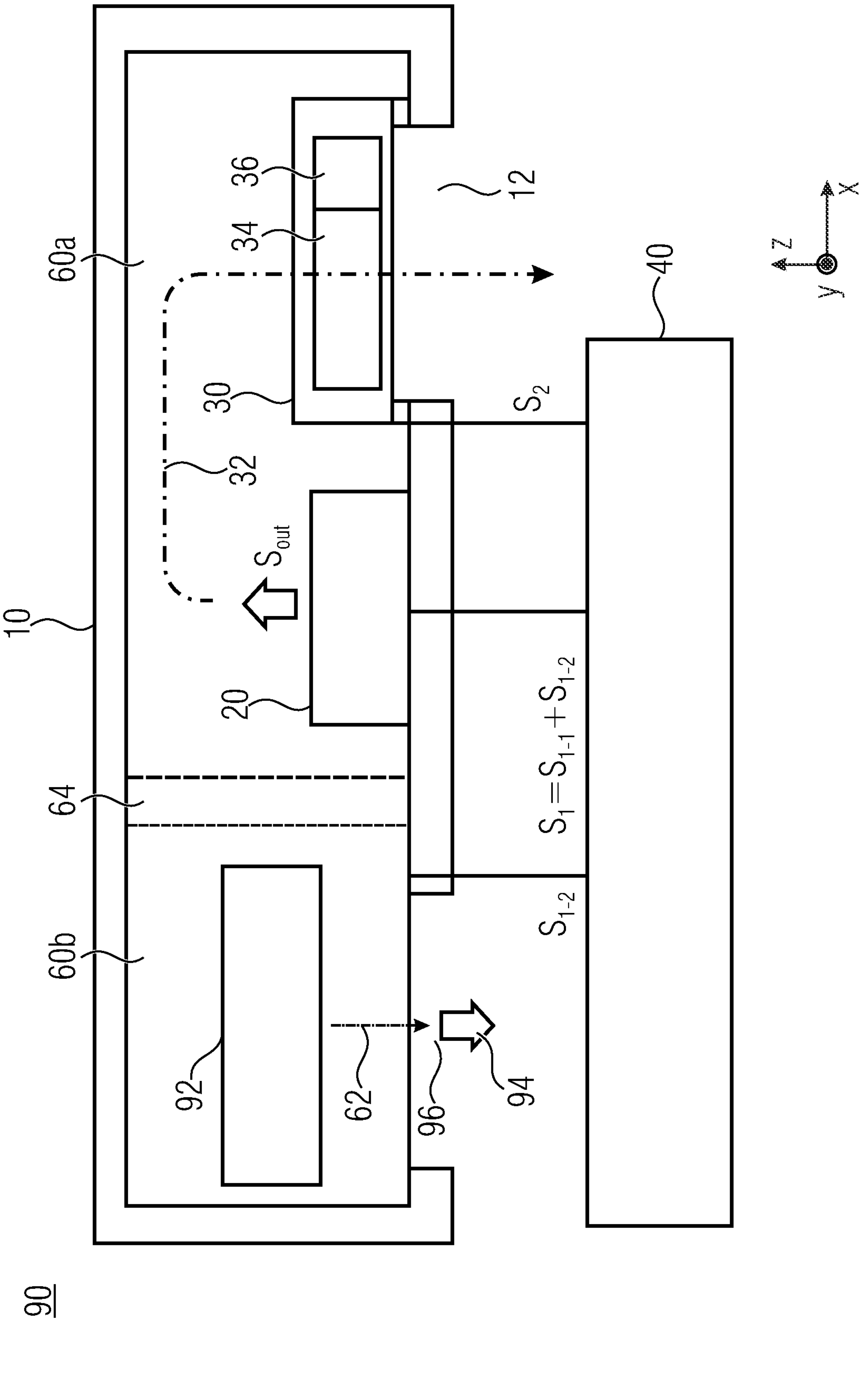
FIG. 9 shows a schematic cross section of a multi-way speaker device, comprising the speaker device as described herein according to an embodiment.

FIG. 9 shows a schematic cross section of a multi-way speaker device 90, comprising the speaker device 100 as described herein.

The multi-way speaker device 90 can include a further transducer element 92 configured to receive at least a part of the audio signal component S1-2 and to generate an audio output signal 94 (S'OUT) in response to the audio signal component S1-2.

In the example shown in FIG. 9, the further transducer element 92 can be configured to receive at least a part of the audio signal component S1-2 from the controller 40. However, the further transducer element 92 may be configured to receive at least a part of the audio signal component S1-2 from any other device. Furthermore, at least one of the multi-way speaker device 90, the controller 40, and the further transducer element may comprise a filtering device configured to filter at least a part of the audio signal component S1-2 from the first actuation signal S1. The further transducer element 92 may be configured to receive the first actuation signal S2 form the controller 40.

The further transducer element 92 may be arranged in the housing 10, where the housing 10 provides a further acoustic path 62 to a further acoustic aperture 96 (in the housing 10). The further transducer element 92 may comprise a membrane structure or a cantilever structure, or both. In the case of a membrane, the entire membrane area may be deflected in order to generate the audio output signal 94 (S'OUT). In the case of a cantilever arrangement, cantilever structures of the cantilever arrangement may be configured to move in order to generate the audio output signal 94 (S'OUT).

In the example shown in FIG. 9, the housing 10 comprises a main cavity 60*a* for the transducer element 20 and a further cavity 60*b* for the further transducer element 92, where the main cavity is separated (e.g., by a wall 64 indicated in dashed lines) from the further cavity. Alternatively, the transducer element 20 and the further transducer element 92 may be arranged in the same cavity 60*a*. The housing 10 therefore may provide the acoustic path 32 that extends through the shutter element 30 and a further acoustic path 62 that is separate from the acoustic path 32 (e.g., by the wall 64). As a result, the shutter element 30 may be unable to demodulate sound in the further acoustic path 62.

In the example shown in FIG. 9, the transducer element 20, the further transducer element 92, and the shutter element 30 are arranged in the same plane in the housing 10. Alternatively, at two (or none) of these components may be arranged in the same plane.

Additional embodiments and aspects are described which may be used alone or in combination with the features and functionalities described herein.

According to an embodiment, a speaker device comprises a housing having an acoustic aperture, a transducer element in the housing configured to receive a first actuation signal and to generate an acoustic output signal in response to the first actuation signal, a shutter element in the housing configured to receive a second actuation signal, where the shutter element is arranged laterally offset to the transducer in the housing, and where the shutter element is arranged in an acoustic path between the transducer element and the acoustic aperture and comprises a movable shutter portion, which is movable in opposite directions in response to the second actuation signal, and a controller configured to provide the first actuation signal to the transducer element, where the first actuation signal has an ultrasonic signal component which is modulated with an audio signal component, and to provide the second actuation signal to the shutter element, where the second actuation signal has half the frequency of the ultrasonic signal component.

According to an embodiment, the shutter element spans the acoustic path.

According to an embodiment, the shutter element can include a stationary portion, which surrounds the movable shutter portion.

According to an embodiment, the movable shutter portion of the shutter element can be in a closed condition aligned in parallel to or in the same plane with the stationary portion of the shutter element.

According to an embodiment, the movable shutter portion of the shutter element can include a single movable shutter portion, which is movable in opposite directions in response to the second actuation signal.

According to an embodiment, the single movable shutter portion can include a cantilever element.

According to an embodiment, the movable shutter portion of the shutter element can include a first and second movable shutter portion, which are movable in opposite directions in response to the second actuation signal, where the first movable shutter portion can include a first cantilever element or a first group of cantilever elements, and the second movable shutter portion can include or is formed by a second cantilever element or a second group of cantilever elements, and where the first and second movable shutter portion can be arranged laterally adjacent to each other.

According to an embodiment, the movable shutter portion of the shutter element can include a disc element which is tiltable around a tilting axis, where a first and second movable shutter portion of the disc element extend in opposite directions from the tilting axis.

According to an embodiment, the tilting axis can be a central axis through the center of gravity of the disc element.

According to an embodiment, the shutter element can be configured to provide consecutive open and closed conditions of the acoustic path based on the second actuation signal, where the shutter element can be configured to comprise two closed conditions during one period of the second actuation signal.

According to an embodiment, the transducer element can include a piezo-electrically actuated membrane structure or a cantilever structure.

According to an embodiment, the transducer element and the shutter element can be arranged in the same plane in the housing.

According to an embodiment, the center distance between the transducer element and the shutter element can be less than a quarter of the wavelength of the of the ultrasonic signal component.

According to an embodiment, the frequency of the ultrasonic signal component of the first actuation signal corresponds within a range of +/−5% to a resonance frequency of the transducer element, and where the frequency of the second actuation signal corresponds within a range of +/−5% to a resonance frequency of the shutter element.

According to an embodiment, a multi-way speaker device comprises the speaker device as described herein, and a further transducer element configured to receive at least a part of the audio signal component and to generate an audio output signal in response to the audio signal component.

According to an embodiment, the further transducer element can be arranged in the housing, where the housing provides a further acoustic path to a further acoustic aperture in the housing.

According to an embodiment, the transducer element, the further transducer element and the shutter element can be arranged in the same plane in the housing.

Although some aspects have been described as features in the context of an apparatus it is clear that such a description may also be regarded as a description of corresponding features of a method. Although some aspects have been described as features in the con-text of a method, it is clear that such a description may also be regarded as a description of corresponding features concerning the functionality of an apparatus.

In the foregoing detailed Description, it can be seen that various features are grouped together in examples for the purpose of streamlining the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present embodiments. This application is intended to cover any adaptations or variations of the specific embodiments discussed herein.

What is claimed is:

1. A speaker device comprising:

a housing having an acoustic aperture;

a transducer element in the housing configured to receive a first actuation signal and to generate an acoustic output signal in response to the first actuation signal;

a shutter element in the housing configured to receive a second actuation signal, wherein the shutter element is arranged in an acoustic path between the transducer element and the acoustic aperture and comprises a movable shutter portion, which is movable in opposite directions in response to the second actuation signal; and a controller configured to provide the first actuation signal to the transducer element, wherein the first actuation signal has an ultrasonic signal component which is modulated with an audio signal component, and the controller is further configured to provide the second actuation signal to the shutter element, wherein the second actuation signal has a second frequency that is half of a first frequency of the ultrasonic signal component, wherein the shutter element further comprises a stationary portion surrounding the movable shutter portion, wherein the movable shutter portion, in a closed condition, is aligned in parallel to or in a common plane with the stationary portion of the shutter element, wherein the movable shutter portion comprises a first shutter portion and a second shutter portion, which are movable in opposite directions in response to the second actuation signal, wherein the first shutter portion comprises a first cantilever element, and the second shutter portion comprises a second cantilever element, and wherein the first shutter portion and the second shutter portion are arranged laterally adjacent to each other, and wherein the movable shutter portion comprises a disc element which is tiltable around a tilting axis, wherein the first shutter portion and the second shutter portion extend in opposite directions from the tilting axis.

2. The speaker device of claim 1, wherein the shutter element spans the acoustic path.

3. The speaker device of claim 1, wherein the movable shutter portion is movable in opposite directions in response to the second actuation signal.

4. The speaker device of claim 3, wherein the movable shutter portion comprises a cantilever element.

5. The speaker device of claim 1, wherein the tilting axis is a central axis through a center of gravity of the disc element.

6. The speaker device of claim 1, wherein the shutter element is configured to provide consecutive open and closed conditions of the acoustic path based on the second actuation signal, wherein the shutter element is configured to comprise two closed conditions during one period of the second actuation signal.

7. The speaker device of claim 1, wherein the transducer element comprises a piezo-electrically actuated membrane structure or a cantilever structure.

8. The speaker device of claim 1, wherein the transducer element and the shutter element are arranged in the same plane in the housing.

9. The speaker device of claim 1, wherein a center distance between the transducer element and the shutter element is less than one quarter of a wavelength of the ultrasonic signal component.

10. The speaker device of claim 1, wherein the first frequency corresponds within a range of +/−10% to a first resonance frequency of the transducer element, and wherein the second frequency corresponds within a range of +/−5% to a second resonance frequency of the shutter element.

11. A speaker device comprising:

a housing having an acoustic aperture;

a transducer element in the housing configured to receive a first actuation signal and to generate an acoustic output signal in response to the first actuation signal;

a shutter element in the housing configured to receive a second actuation signal, and wherein the shutter element is arranged in an acoustic path between the transducer element and the acoustic aperture and comprises at least one movable shutter portion movable in opposite directions in response to the second actuation signal; and a controller configured to:

provide the first actuation signal to the transducer element, wherein the first actuation signal has an ultrasonic signal component that is modulated with an audio signal component; and provide the second actuation signal to the shutter element, wherein the second actuation signal has half a frequency of the ultrasonic signal component, wherein the shutter element is configured to:

provide consecutive open and closed conditions of the acoustic path based on the second actuation signal, and comprise two closed conditions during one period of the second actuation signal, and wherein the at least one movable shutter portion is configured to provide the closed condition when arranged in a closing position and to provide open conditions when being moved in either of the opposite directions.

12. The speaker device of claim 11, wherein the shutter element spans the acoustic path.

13. The speaker device of claim 11, wherein the shutter element further comprises a stationary portion that surrounds the movable shutter portion.

14. The speaker device of claim 13, wherein the movable shutter portion of the shutter element is in a closed condition aligned in parallel to or in the same plane with the stationary portion of the shutter element.

15. The speaker device of claim 11, wherein the movable shutter portion of the shutter element comprises a single movable shutter portion, which is movable in opposite directions in response to the second actuation signal.

16. The speaker device of claim 15, wherein the single movable shutter portion comprises a cantilever element.

17. The speaker device of claim 11, wherein the movable shutter portion of the shutter element comprises a first movable shutter portion and a second movable shutter portion, which are movable in opposite directions in response to the second actuation signal, wherein the first movable shutter portion comprises a first cantilever element or a first group of cantilever elements and the second movable shutter portion comprises a second cantilever element or a second group of cantilever elements, and wherein the first and second movable shutter portions are arranged laterally adjacent to each other.

18. The speaker device of claim 11, wherein the movable shutter portion of the shutter element comprises a disc element, which is tiltable around a tilting axis, wherein a first and second movable shutter portions of the disc element extend in opposite directions from the tilting axis.

19. The speaker device of claim 18, wherein the tilting axis is a central axis through the center of gravity of the disc element.

20. The speaker device of claim 11, wherein the transducer element comprises a piezo-electrically actuated membrane structure or a cantilever structure.

* * * * *